(12) United States Patent
Yamamoto et al.

(10) Patent No.: US 9,487,210 B2
(45) Date of Patent: Nov. 8, 2016

(54) HYBRID VEHICLE AND CONTROL METHOD FOR HYBRID VEHICLE

(71) Applicants: Masaya Yamamoto, Kasugai (JP); Shunya Kato, Seto (JP); Akihiro Kimura, Toyota (JP); Hideki Furuta, Anjo (JP)

(72) Inventors: Masaya Yamamoto, Kasugai (JP); Shunya Kato, Seto (JP); Akihiro Kimura, Toyota (JP); Hideki Furuta, Anjo (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 72 days.

(21) Appl. No.: 14/278,106

(22) Filed: May 15, 2014

(65) Prior Publication Data

US 2014/0343775 A1    Nov. 20, 2014

(30) Foreign Application Priority Data

May 17, 2013    (JP) ................ 2013-104904

(51) Int. Cl.
| | |
|---|---|
| *B60W 10/08* | (2006.01) |
| *B60W 20/00* | (2016.01) |
| *B60W 10/10* | (2012.01) |
| *B60W 10/26* | (2006.01) |
| *B60K 6/445* | (2007.10) |

(Continued)

(52) U.S. Cl.
CPC ............. *B60W 20/30* (2013.01); *B60K 6/365* (2013.01); *B60K 6/445* (2013.01); *B60K 6/547* (2013.01); *B60W 10/06* (2013.01); *B60W 10/08* (2013.01); *B60W 10/10* (2013.01); *B60W 10/115* (2013.01); *B60W 10/26* (2013.01); *B60W 30/19* (2013.01); *B60W 2510/244* (2013.01); *B60W 2710/0661* (2013.01); *B60W 2710/082* (2013.01); *B60W 2710/083* (2013.01); *B60W 2710/248* (2013.01); *Y02T 10/6239* (2013.01); *Y02T 10/6286* (2013.01); *Y10S 903/93* (2013.01)

(58) Field of Classification Search
CPC ......... B60W 2710/082; B60W 30/19; B60W 10/08; B60W 10/10; B60K 6/365; B60K 6/445; B60L 11/1805; B60L 2240/423; Y02T 10/648; Y02T 10/6286
See application file for complete search history.

(56) References Cited

U.S. PATENT DOCUMENTS

| | | | | |
|---|---|---|---|---|
| 7,101,308 | B2* | 9/2006 | Joe .......................... | B60L 15/20 180/65.6 |
| 7,217,221 | B2* | 5/2007 | Sah ........................ | B60K 6/445 477/3 |
| 7,954,579 | B2* | 6/2011 | Rodriguez ............ | B60W 10/08 180/65.265 |

(Continued)

FOREIGN PATENT DOCUMENTS

| | | |
|---|---|---|
| JP | 2012-240662 A | 12/2012 |
| JP | 2013-23156 | 2/2013 |

*Primary Examiner* — Khoi Tran
*Assistant Examiner* — Ryan Rink
(74) *Attorney, Agent, or Firm* — Oblon, McClelland, Maier & Neustadt, L.L.P

(57) ABSTRACT

A hybrid vehicle includes a differential device, a first motor, an engine, a second motor, an engagement device, and an electronic control unit. The electronic control unit is configured to control the first motor and the second motor when an engagement state of the engagement device changes, such that a first angular acceleration and a second angular acceleration reach a first target value and the second target value respectively, the first angular acceleration and the second angular acceleration being two angular accelerations of the engine, the first motor, and the second motor and to calculate the first target value and the second target value by applying a constraint condition to at least one of the first target value and the second target value.

10 Claims, 13 Drawing Sheets

(51) Int. Cl.
  *B60K 6/547*    (2007.10)
  *B60W 10/06*    (2006.01)
  *B60W 10/115*   (2012.01)
  *B60W 30/19*    (2012.01)
  *B60K 6/365*    (2007.10)

(56) References Cited

U.S. PATENT DOCUMENTS

| | | | | |
|---|---|---|---|---|
| 8,170,736 B2* | 5/2012 | Muta | ................ | B60L 11/14<br>180/65.1 |
| 8,606,488 B2* | 12/2013 | Falkenstein | ............ | B60K 6/48<br>180/65.275 |
| 8,631,891 B2* | 1/2014 | Wilmanowicz | ........ | B60K 6/365<br>180/65.1 |
| 2005/0080535 A1* | 4/2005 | Steinmetz | ............. | B60W 10/02<br>701/51 |
| 2005/0274553 A1* | 12/2005 | Salman | .................... | B60K 6/52<br>180/65.28 |
| 2008/0122228 A1* | 5/2008 | Liu | ......................... | B60K 6/48<br>290/40 C |
| 2012/0127893 A1* | 5/2012 | Binder | .................. | H04L 49/101<br>370/255 |
| 2013/0274967 A1* | 10/2013 | Tan | ....................... | B60W 20/11<br>701/22 |
| 2014/0005902 A1* | 1/2014 | Venkatachalam<br>Ananthasivan | ........ | B60W 10/06<br>701/54 |

* cited by examiner

FIG. 4

|     | C1 | C2 | C3 | B1 | B2  | F1 |
|-----|----|----|----|----|-----|----|
| 1st | O  |    |    |    | (O) | △  |
| 2nd | O  |    |    | O  |     |    |
| 3rd | O  | O  |    |    |     |    |
| 4th |    | O  |    | O  |     |    |
| R   |    |    | O  |    | O   |    |
| N   |    |    |    |    |     |    |

O :ENGAGING
(O) :ENGAGING DURING ENGINE BRAKING
△ :ENGAGING ONLY IN DRIVING

HYBRID VEHICLE AND CONTROL METHOD FOR HYBRID VEHICLE

INCORPORATION BY REFERENCE

The disclosure of Japanese Patent Application No. 2013-104904 filed on May 17, 2013 including the specification, drawings and abstract is incorporated herein by reference in its entirety.

BACKGROUND OF THE INVENTION

1. Field of the Invention

The present invention relates to a hybrid vehicle and a control method for the hybrid vehicle, and particularly to a hybrid vehicle that includes a differential device constituted with a first to a third rotating elements, a first and a second motors and an internal combustion engine coupled to the differential device, and an engagement device configured to change a power transmission state between the differential device and a drive shaft, and a control method for the hybrid vehicle.

2. Description of Related Art

Japanese Patent Application Publication No. 2013-23156 (JP 2013-23156 A) discloses the hybrid vehicle that includes the differential device and an automatic transmission disposed in a power transmission path from the differential device to driving wheels. The differential device is constituted with a first rotating element that is coupled to a first motor, a second rotating element that is an input rotating member and coupled to an engine, and a third rotating element that is an output rotating member. A second motor is coupled to a power transmission path from the third rotating element to the driving wheels (refer to JP 2013-23156 A).

SUMMARY OF THE INVENTION

The hybrid vehicle including the differential device and the transmission as described above requires controlling not only engine speed but also the speeds of the first and the second motors to reach a predetermined target values respectively. When the speed of the engine coupled to the second rotating element and the speed of the second motor coupled to the third rotating element are determined, the speed of the first motor coupled to the first rotating element is uniquely determined. The parameters for controlling the engine speed and the speed of the second motor include engine torque, torque capacity of the transmission, torque of the first motor, and torque of the second motor. The hybrid vehicle as described above is a multi-degree-of-freedom system having a number of parameters, and its control may be complex.

Specifically, during gear shift in which an engagement state of the transmission (engagement device) changes, it is necessary to take into consideration various constraint conditions such as the reduction of shock, overspeed prevention of the engine and the motor, charging and discharging limitation of an electric storage device, and upper and lower limits of the torque of the motor. The foregoing JP 2013-23156 A does not specifically discuss how the control target value is set for the various constraint conditions as described above during gear shift in which an engagement state of the transmission (engagement device) changes.

The present invention provides, in the hybrid vehicle including the differential device and the engagement device, setting an appropriate control target value taking a constraint condition into consideration when the engagement state of the engagement device changes.

A first aspect of the present invention is a hybrid vehicle including a differential device, a first motor, an engine, a second motor, an engagement device, and an electronic control unit. The differential device includes a first rotating element, a second rotating element, and a third rotating element. The first motor is coupled to the first rotating element. The engine is coupled to the second rotating element. The second motor is coupled to a power transmission path between the third rotating element and a drive shaft. The engagement device is disposed in the power transmission path and configured to change a power transmission state between the differential device and the drive shaft. The electronic control unit is configured to: (a) control the first motor and the second motor when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and (b) calculate the first target value and the second target value by applying a constraint condition to at least one of the first target value and the second target value.

According to the aspect described above, the first motor, and the second motor are controlled when an engagement state of the engagement device changes, such that a first angular acceleration and a second angular acceleration reach the first target value and the second target value respectively, the first angular acceleration and the second angular acceleration being two angular accelerations of the engine, the first motor, and the second motor. That is, the relation between the angular acceleration and the torque of the motor is expressed with the equation of motion, and thus by controlling (the torque of) the first motor and the second motor, the first angular acceleration and the second angular acceleration can be controlled to reach the first target value and the second target value. Then, the first target value and the second target value are calculated by applying a constraint condition to at least of one of the first target value and the second target value. Therefore, according to the present invention, in the hybrid vehicle including the differential device and the engagement device, an appropriate control target values taking a constraint condition into consideration can be set when the engagement state of the engagement device changes.

In the foregoing aspect, the electronic control unit may be configured to correct the first target value and the second target value such that the first target value and the second target value satisfy the constraint condition when the first target value and the second target value do not satisfy the constraint condition.

In the foregoing aspect, the first angular acceleration may be the angular acceleration of the engine, and the second angular acceleration may be the angular acceleration of the second motor.

In the foregoing aspect, an upper limit and a lower limit may be set to each torque of the first motor and the second motor, and the electronic control unit may be configured to set the constraint condition by performing coordinate transformations of the upper limit and the lower limit of the torque into an angular acceleration plane where the first angular acceleration and the second angular acceleration are variables.

In the foregoing aspect, the hybrid vehicle further includes an electric storage device. The electric storage device is configured to supply and receive electric power to and from the first motor and the second motor, wherein the electronic control unit may be configured to set the constraint condition by performing coordinate transformations of dischargeable electric power and chargeable electric power into an angular acceleration plane where the first angular acceleration and the second angular acceleration are variables, the dischargeable electric power being a upper limit of the discharging electric power of the electric storage device, and the chargeable electric power being a upper limit of the charging electric power of the electric storage device.

In the foregoing aspect, the constraint condition may be set to the first target value such that the speed of the engine does not exceed a predetermined upper limit and lower limit.

In the foregoing aspect, the engagement device includes a transmission. The constraint condition may be set to the second target value such that gear shift of the transmission proceeds.

In the foregoing aspect, the constraint condition may be set to the first target value such that the speed of the engine indicates predetermined behavior when the engagement state of the engagement device changes.

In the foregoing aspect, an electric storage device is configured to supply and receive electric power to and from the first motor and the second motor. An upper limit and a lower limit are set to each torque of the first motor and the second motor. The engagement device includes a transmission. The constraint condition includes a first condition, a second condition, a third condition, and a fourth condition. The electronic control unit may be configured to apply the constraint condition to the first target value and the second target value in the order of the first condition, the second condition, the third condition, and the fourth condition, the first condition is set to the first target value such that a speed of the engine indicates predetermined behavior when the engagement state of the engagement device changes, the second condition is set to the second target value such that gear shift of the transmission proceeds, the third condition includes at least one of (i) a condition that is set by performing coordinate transformations of dischargeable electric power and chargeable electric power into an angular acceleration plane where the first angular acceleration and the second angular acceleration are variables, the dischargeable electric power being a upper limit of the discharging electric power of the electric storage device, and the chargeable electric power being a upper limit of the charging electric power of the electric storage device, and (ii) a condition that is set to the first target value such that the speed of the engine does not exceed a specified upper limit and lower limit, and the fourth condition is set by performing the coordinate transformations of the upper limit and the lower limit of each torque of the first motor and the second motor into the angular acceleration plane.

In the foregoing aspect, the electronic control unit may be configured to calculate a first torque and a second torque based on the first target value and the second target value to which the constraint condition is applied by using a model of the differential device expressing a relation among the first angular acceleration, the second angular acceleration, the first torque and the second torque respectively representing the torque of the first motor and the second motor, the torque of the engine, and torque capacity of the engagement device, and the electronic control unit may be configured to control the first motor and the second motor so as to respectively output the first torque and the second torque.

In the foregoing aspect, the electronic control unit may be configured to estimate the torque capacity based on the angular accelerations of the first motor and the second motor by using the model, and the electronic control unit may be configured to calculate the first torque and the second torque by using the estimated torque capacity.

In the foregoing aspect, the electronic control unit may be configured to estimate the torque of the engine based on the angular accelerations of the first motor and the second motor by using the model, and the electronic control unit may be configured to calculate the first torque and the second torque by using the estimated torque of the engine.

In the foregoing aspect, the electronic control unit may be configured to perform low-pass filter processing to measured values of speeds of the first motor and the second motor, and the electronic control unit may be configured to calculate the angular accelerations of the first motor and the second motor based on the measured values to which the low-pass filter processing is performed.

In the foregoing aspect, the electronic control unit may be configured to change a time constant in the low-pass filter processing depending on driving conditions of the hybrid vehicle.

In the foregoing aspect, the engagement device includes a transmission. The transmission may be disposed in a power transmission path between the second motor and the drive shaft.

A second aspect of the present invention is a hybrid vehicle including a differential device constituted with a first rotating element, a second rotating element, and a third rotating element, a first motor coupled to the first rotating element, an engine coupled to the second rotating element, a second motor coupled to a power transmission path between the third rotating element and a drive shaft, an engagement device disposed in the power transmission path and configured to change a power transmission state between the differential device and the drive shaft, and an electronic control unit. The electronic control unit configured to: (a) control the first motor and the second motor when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and (b) correct the first target value and the second target value such that the first target value and the second target value satisfy a constraint condition, when the first target value and the second target value do not satisfy the constraint condition.

A third aspect of the present invention is a control method for a hybrid vehicle including a differential device constituted with a first rotating element, a second rotating element, and a third rotating element, a first motor coupled to the first rotating element, an engine coupled to the second rotating element, a second motor coupled to a power transmission path between the third rotating element and a drive shaft, an engagement device disposed in the power transmission path and configured to change a power transmission state between the differential device and the drive shaft, and an electronic control unit. The control method comprising: (a) controlling the first motor and the second motor by the electronic control unit when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and (b) calculating, by the electronic control unit, the first target value and the second target value by applying a constraint condition to at least of the first target value and the second target value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 shows an engagement operation table for the transmission unit shown in FIG. 3;

DETAILED DESCRIPTION OF EMBODIMENTS

Figure 1:
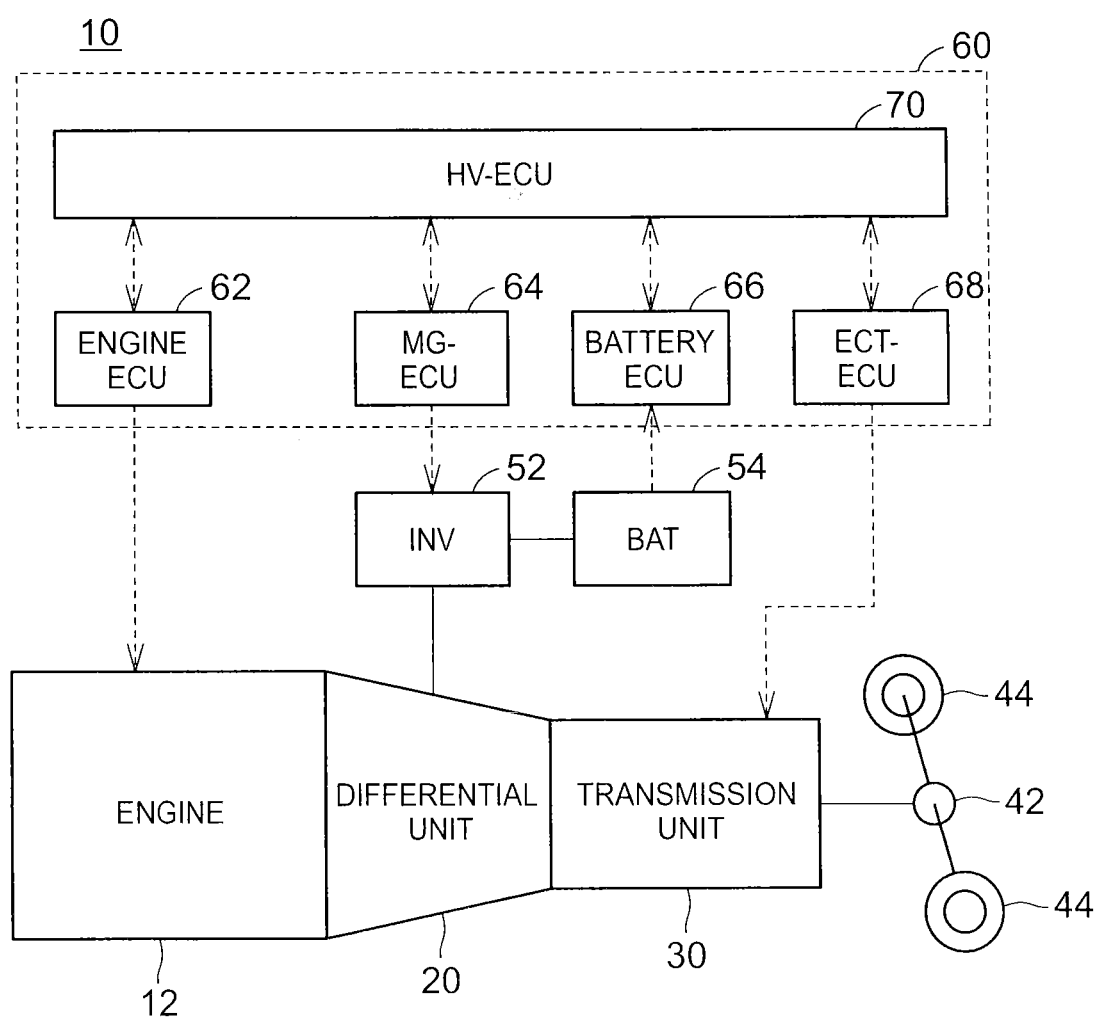
FIG. 1 is an overall configuration diagram of a hybrid vehicle according to a first embodiment of the present invention.

A detailed description will hereinafter be made on embodiments of the present invention with reference to the accompanying drawings. Although plural embodiments are described below, appropriate combination of the structures described in each embodiment is originally intended. The same or equivalent part in the drawing is given with the same reference numeral and symbol, and its description is not repeated.

FIG. 1 is an overall configuration diagram of a hybrid vehicle 10 according to the first embodiment of the present invention. Referring to FIG. 1, the hybrid vehicle 10 includes an engine 12, a differential unit 20, a transmission unit 30, a differential gear mechanism 42, and driving wheels 44. The hybrid vehicle 10 also includes an inverter 52, an electric storage device 54, and an electronic control unit 60.

The engine 12 is an internal combustion engine and constituted with a gasoline engine or a diesel engine, for example. The engine 12 converts thermal energy generated by the combustion of fuel into kinetic energy of a moving object such as a piston or a rotor and outputs the converted kinetic energy to the differential unit 20. For example, if the moving object is a piston and the motion thereof is reciprocating motion, the reciprocating motion is converted into motion through a so-called crank mechanism, and the kinetic energy of the piston is transferred to the differential unit 20.

The differential unit 20 is coupled to the engine 12. The differential unit 20 includes, as described below, a motor generator driven by the inverter 52 and a power-split device that split the output of the engine 12 into a transmission member to the transmission unit 30 and the motor generator. The structure of the differential unit 20 is described later.

The transmission unit 30 is coupled to the differential unit 20 and configured to change the ratio (transmission gear ratio) between a speed of the aforementioned transmission member (an input shaft of transmission unit 30) connected to the differential unit 20 and a speed of a drive shaft (an output shaft of the transmission unit 30) connected to the differential gear mechanism 42. In this first embodiment, the transmission unit 30 is configured with a stepped transmission that change the transmission gear ratio in a stepwise manner. The transmission unit 30 may be configured with a continuously variable transmission. The differential gear mechanism 42 is coupled to the output shaft of the transmission unit 30 and transfers the power output from the transmission unit 30 to the driving wheels 44. The structure of the transmission unit 30 is also described later together with the differential unit 20.

The inverter 52 is electrically connected to the electric storage device 54 and drives the motor generator included in the differential unit 20 based on a control signal from the electronic control unit 60. The inverter 52 is constituted with, for example, a bridge circuit including power semiconductor switching elements for three phases. Although not specifically shown, a voltage converter may be disposed between the inverter 52 and the electric storage device 54.

The electric storage device 54 is a rechargeable direct-current power source and constituted with a secondary battery such as, typically, a lithium-ion battery or a nickel-metal hydride battery. The electric storage device 54 stores electric power for driving and supplies the stored electric power to the inverter 52. Furthermore, the electric storage device 54 is charged by receiving the electric power generated by the motor generator of the differential unit 20 from the inverter 52. The electric storage device 54 may be formed with an electric storage element such as an electric double layer capacitor, in place of the secondary battery.

The electronic control unit 60 includes an engine electronic control unit 62 (engine ECU), an MG-ECU 64, a battery ECU 66, and an ECT-ECU 68, and an HV-ECU 70. Each of those ECUs includes a central processing unit (CPU), a memory device, an input-output buffer, and the like (those not shown in the drawing) and executes various kinds of control described below. The control executed by each ECU is not limited to the processing by software and may be processed with dedicated hardware (electronic circuit). In this first embodiment, the electronic control unit 60 is constituted with the ECUs described above. The electronic control unit 60 may be constituted with one ECU.

The engine ECU 62 generates a throttle signal, an ignition signal, a fuel injection signal, and other signals for driving the engine 12 based on an engine torque command and the like received from the HV-ECU 70 and outputs the generated signals to the engine 12. The MG-ECU 64 generates a control signal for controlling the inverter 52 based on the command from the HV-ECU 70 and outputs the generated control signal to the inverter 52.

The battery ECU 66 estimates a charging condition of the electric storage device 54 based on the voltage and the current of the electric storage device 54 detected by an unillustrated voltage sensor and current sensor and outputs the estimated result to the HV-ECU 70. The charging condition of the electric storage device 54 is also referred to as a "State Of Charge (SOC)" and is expressed as 0 to 100% when a fully charging condition is assumed to be 100%. The ECT-ECU 68 generates an oil pressure command for controlling the transmission unit 30 based on a torque capacity command and the like received from the HV-ECU 70 and outputs the generated oil pressure command to the transmission unit 30.

The HV-ECU 70 receives detection signals from various sensors and generates various commands for controlling the components of the hybrid vehicle 10. As one kind of main control executed by the HV-ECU 70, the HV-ECU 70 executes driving control for controlling the engine 12, the differential unit 20, and the transmission unit 30 to achieve the predetermined state and drive the vehicle based on the operation amount of an accelerator pedal, vehicle speed, and the like. The HV-ECU 70 also executes gear shift control for controlling the behavior of the engine 12 and the differential unit 20 to reach predetermined target values during gear shift by the transmission unit 30.

In this first embodiment, the target behavior of the engine 12 and the differential unit 20 during the gear shift can be achieved with the angular acceleration of the engine 12 and the angular acceleration of the motor generator included in the differential unit 20. Various specified constraint conditions are applied to the angular acceleration, and thus the engine 12 and the differential unit 20 during the gear shift are controlled so as to achieve the corrected angular acceleration according to the constraint conditions. This control is described later in detail.

Figure 2:
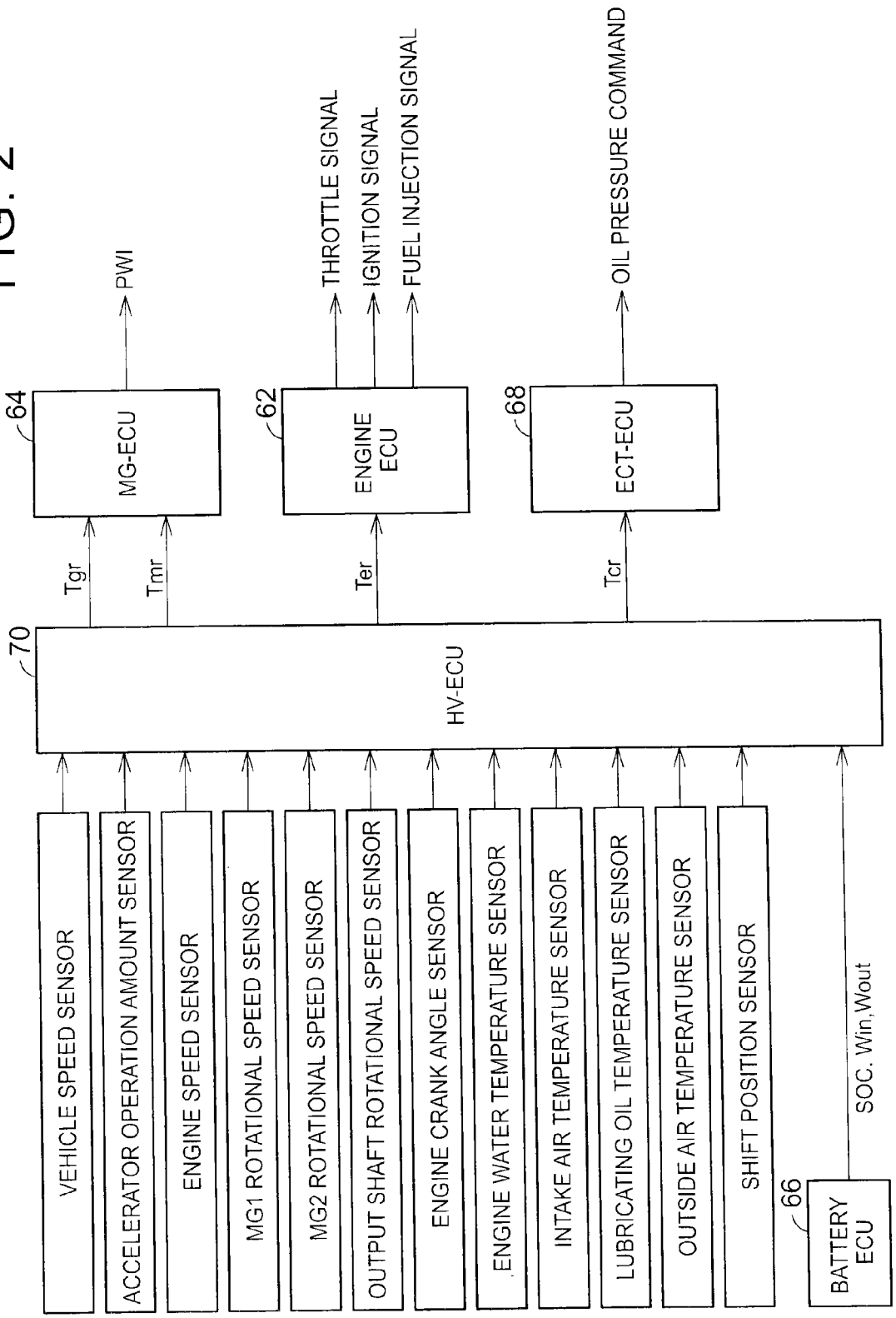
FIG. 2 is a diagram that shows main signals input to or output from the electronic control unit shown in FIG. 1.

FIG. 2 shows main signals input to or output from the electronic control unit 60 shown in FIG. 1. Referring to FIG. 2, the HV-ECU 70 receives a signal from a vehicle speed sensor for detecting the speed of the hybrid vehicle 10, a signal from an accelerator operation amount sensor for detecting the operation amount of an accelerator pedal, and a signal from an engine speed sensor for detecting the speed of the engine 12. The HV-ECU 70 also receives a signal from an MG1 speed sensor for detecting the speed of a motor generator MG1 (described later) included in the differential unit 20, a signal from an MG2 speed sensor for detecting the speed of a motor generator MG2 (described later) included in the differential unit 20, and a signal from an output shaft speed sensor for detecting the speed of an output shaft of the differential unit 20 (corresponding to an input shaft of the transmission unit 30).

The HV-ECU 70 also receives a signal from an engine crank angle sensor for detecting the crank angle of the engine 12, a signal from an engine water temperature sensor for detecting the temperature of coolant of the engine 12, and a signal from an intake air temperature sensor for detecting the temperature of air drawn into the engine 12. The HV-ECU 70 further receives a signal from a lubricating oil temperature sensor for detecting temperatures of lubricating oil in the differential unit 20 and the transmission unit 30, a signal from an outside air temperature sensor for detecting the outside air temperature around the hybrid vehicle 10, and a signal from a shift position sensor for detecting a shift position instructed by a gear stick. The HV-ECU 70 still further receives a signal representative of the SOC of the electric storage device 54, a signal representative of chargeable electric power Win indicating a upper limit of charging electric power of the electric storage device 54, a signal representative of dischargeable electric power Wout indicating a upper limit of discharging electric power of the electric storage device 54, and the like from the battery ECU 66.

Then, the HV-ECU 70 generates, for example, an engine torque command Ter representative of a target output torque of the engine 12 based on the signals described above and outputs it to the engine ECU 62. The engine ECU 62 receiving the engine torque command Ter generates the throttle signal, the ignition signal, the fuel injection signal, and other signals for driving the engine 12 and outputs them to the engine 12.

The HV-ECU 70 also generates torque commands Tgr and Tmr for driving the motor generators MG1 and MG2 of the differential unit 20 and outputs them to the MG-ECU 64. The HV-ECU 70 generates the torque capacity command Tcr for controlling the transmission unit 30 and outputs it to the ECT-ECU 68.

The MG-ECU 64 receiving the torque commands Tgr and Tmr generates a signal PWI for controlling the inverter 52 such that the motor generators MG1 and MG2 generate the torque corresponding to the torque commands Tgr and Tmr and outputs the generated signal PWI to the inverter 52. The ECT-ECU 68 receiving the torque capacity command Tcr generates the oil pressure command such that the transmission unit 30 obtains the torque capacity corresponding to the torque capacity command Tcr and outputs the generated oil pressure command to the transmission unit 30.

Figure 3:
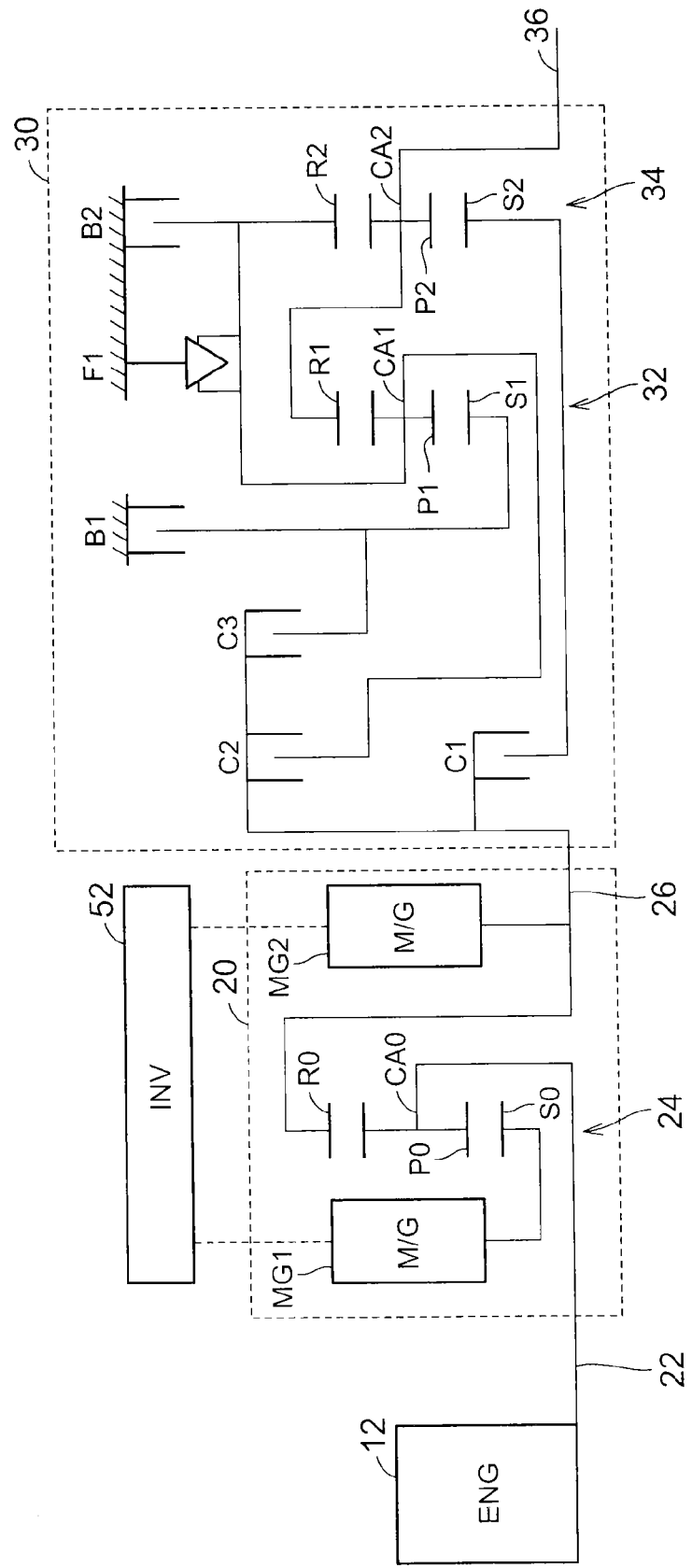
FIG. 3 is a diagram that shows a configuration of the differential unit and the transmission unit shown in FIG. 1.

FIG. 3 is a diagram that shows a configuration of the differential unit 20 and the transmission unit 30 shown in FIG. 1. In this first embodiment, the differential unit 20 and the transmission unit 30 are constructed symmetrically with respect to their axes, and thus the lower sides of the differential unit 20 and the transmission unit 30 are not shown in FIG. 3.

Referring to FIG. 3, the differential unit 20 includes the motor generators MG1 and MG2 and the power-split device 24. Each of the motor generators MG1 and MG2 is an alternating-current motor and constituted with, for example, a permanent magnet synchronous motor that includes a rotor in which permanent magnets are buried. The motor generators MG1 and MG2 are driven by the inverter 52.

The power-split device 24 is constituted with a single-pinion type planetary gear and includes a sun gear S0, a pinion gear P0, a carrier CA0, and a ring gear R0. The carrier CA0 is connected to the input shaft 22, that is, the output shaft of the engine 12 and supports the pinion gear P0 in rotatable and revolvable manners. The sun gear S0 is coupled to a rotating shaft of the motor generator MG1. The ring gear R0 is coupled to the transmission member 26 and configured to engage with the sun gear S0 through the pinion gear P0. The transmission member 26 is coupled with a rotating shaft of the motor generator MG2. That is, the ring gear R0 is also coupled to the rotating shaft of the motor generator MG2.

Figure 5:
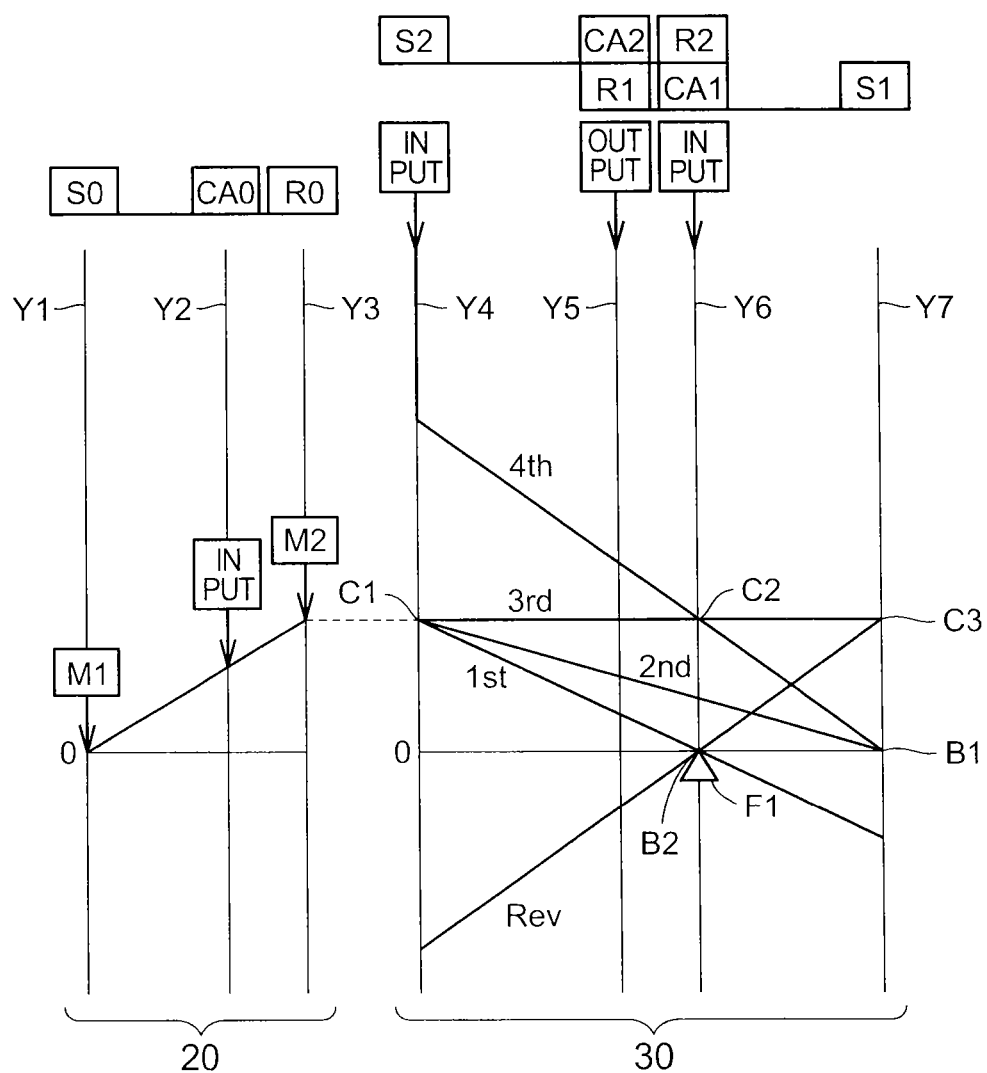
FIG. 5 is a collinear diagram of a transmission mechanism that is constituted with the differential unit and the transmission unit.

The power-split device 24 functions as a differential device by the relative rotation of the sun gear S0, the carrier CA0, and the ring gear R0. The speed of each of the gear S0, the carrier CA0, and the ring gear R0 has a relation in which the speed of the respective gears are connected by straight lines in a collinear diagram as described below (FIG. 5). The motive power output from the engine 12 is distributed to the sun gear S0 and the ring gear R0 by the differential function of the power-split device 24. The motor generator MG1 operates as a generator by using the motive power distributed to the sun gear S0, and the electric power generated by the motor generator MG1 is supplied to the motor generator MG2 or stored in the electric storage device 54 (FIG. 1). The motor generator MG1 generates the electric power by using the motive power split by the power-split device 24, or the motor generator MG2 is driven by using the electric power generated by the motor generator MG1, and consequently the differential unit 20 functions as the continuously variable transmission.

The transmission unit 30 includes single-pinion type planetary gears 32 and 34, clutches C1 to C3, brakes B1 and B2, and a one-way clutch F1. The planetary gear 32 includes a sun gear S1, a pinion gear P1, a carrier CA1, and a ring gear R1. The planetary gear 34 includes a sun gear S2, a pinion gear P2, a carrier CA2, and a ring gear R2.

Each of the clutches C1 to C3 and the brakes B1 and B2 is a friction engagement device that is hydraulically operated and constituted with wet type multiple disks in which stacked multiple friction plates are pressed against each other by hydraulic pressure, band brakes in which one end of a band wrapped around the outer peripheral surface of a rotating drum is tightened by hydraulic pressure, and the like. The one-way clutch F1 supports the carrier CA1 and the ring gear R2 that are coupled to each other in a rotatable manner in one direction and in an unrotatable manner in the other direction.

In the transmission unit 30, the engagement devices that are the clutches C1 to C3, the brakes B1 and B2, and the one-way clutch F1 are engaged with each other in accordance with the engagement operation table shown in FIG. 4, and thus a first-speed gear stage to fourth-speed gear stage and a reverse gear stage are selectively formed. In FIG. 4, a reference symbol "○" indicates an engagement state, "(○)" indicates that components are engaged during engine braking, "Δ" indicates that components are engaged only in driving, and a blank indicates a disengagement state. When all the engagement devices of the clutches C1 to C3 and the brakes B1 and B2 are changed to the disengagement state, a neutral state (a state where power transmission is cut off) can be achieved.

Referring to FIG. 3 again, the differential unit 20 and the transmission unit 30 are coupled with each other through the transmission member 26. An output shaft 36 that is coupled to the carrier CA2 of the planetary gear 34 is coupled to the differential gear mechanism 42 (FIG. 1).

FIG. 5 is a collinear diagram of a transmission mechanism that is constituted with the differential unit 20 and the transmission unit 30. Referring to FIG. 5 along with FIG. 3, a vertical line Y1 in the collinear diagram corresponding to the differential unit 20 represents the speed of the sun gear S0 in the power-split device 24, that is, the speed of the motor generator MG1. A vertical line Y2 represents the speed of the carrier CA0 in the power-split device 24, that is, the speed of the engine 12. A vertical line Y3 represents the speed of the ring gear R0 in the power-split device 24, that is, the speed of the motor generator MG2. The spacing among the vertical lines Y1 to Y3 is determined in accordance with the gear ratio of the power-split device 24.

A vertical line Y4 in the collinear diagram corresponding to the transmission unit 30 represents the speed of the sun gear S2 of the planetary gear 34, and a vertical line Y5 represents the speed of the carrier CA2 of the planetary gear 34 and the ring gear R1 of the planetary gear 32 that are coupled to each other. A vertical line Y6 represents the speed of the ring gear R2 of the planetary gear 34 and the carrier CA1 of the planetary gear 32 that are coupled to each other, and a vertical line Y7 represents the speed of the sun gear S1 of the planetary gear 32. The spacing among the vertical lines Y4 to Y7 is determined in accordance with the gear ratio of the planetary gears 32 and 34.

When the clutch C1 engages, the ring gear R0 of the differential unit 20 is coupled with the sun gear S2 of the planetary gear 34, and the sun gear S2 rotates with the same speed as the ring gear R0. When the clutch C2 engages, the ring gear R0 is coupled with the carrier CA1 of the planetary gear 32 and the ring gear R2 of the planetary gear 34, and the carrier CA1 and the ring gear R2 rotate with the same speed as the ring gear R0. When the clutch C3 engages, the ring gear R0 is coupled with the sun gear S1 of the planetary gear 32, and the sun gear S1 rotates with the same speed as the ring gear R0. When the brake B1 engages, the rotation of the sun gear S1 stops. When the brake B2 engages, the rotation of the carrier CA1 and the ring gear R2 stops.

For example, as shown in the engagement operation table in FIG. 4, when the clutch C1 and brake B1 respectively engage and other clutches and brakes respectively disengage, the collinear diagram for the transmission unit 30 is plotted as a straight line indicated with the reference symbol "2nd". The vertical line Y5 indicating the speed of the carrier CA2 of the planetary gear 34 represents output speed of the transmission unit 30 (the speed of the output shaft 36). As described above, by respectively engaging or disengaging the clutches C1 to C3 and the brakes B1 and B2 in the transmission unit 30 in accordance with the engagement operation table in FIG. 4, the first-speed gear stage to fourth-speed gear stage, the reverse gear stage, and the neutral state can be formed.

On the other hand, by appropriately controlling the speed of the motor generators MG1 and MG2 in the differential unit 20, the continuously variable transmission can be achieved in which the speed of the ring gear R0, that is, the speed of the transmission member 26 can continuously be changed with respect to the specified speed of the engine 12 coupled to the carrier CA0. By coupling the transmission unit 30 capable of changing the transmission gear ratio between the transmission member 26 and the output shaft 36 to the differential unit 20 having such a continuously variable transmission function, the continuously variable transmission function by the differential unit 20 can be obtained, while the transmission gear ratio of the differential unit 20 can be reduced, and the loss in the motor generators MG1 and MG2 can be reduced.

In FIG. 5, a state where the speed of the motor generator MG1 (the speed of the sun gear S0) is zero is shown, by way of example only. Such a state is referred to as a "mechanical point" in which the electric power does not flow through the motor generator MG1 and the motive power of the engine 12 is transmitted without electric conversion. The "mechanical point" does not provide a "power splitting" in which the electric power generated by the motor generator MG1 using the motive power of the engine 12 is supplied to the motor generator MG2 to generate the driving force or a "power circulation" in which the electric power generated by the motor generator MG2 flows through the motor generator MG1, but provides high mechanical efficiency of power transmission. In the hybrid vehicle 10, a plurality of the "mechanical points" can be formed in the differential unit 20 in response to the speed gear stage of the transmission unit 30, and thus high mechanical efficiency of power transmission can be achieved even under various driving conditions.

Figure 6:
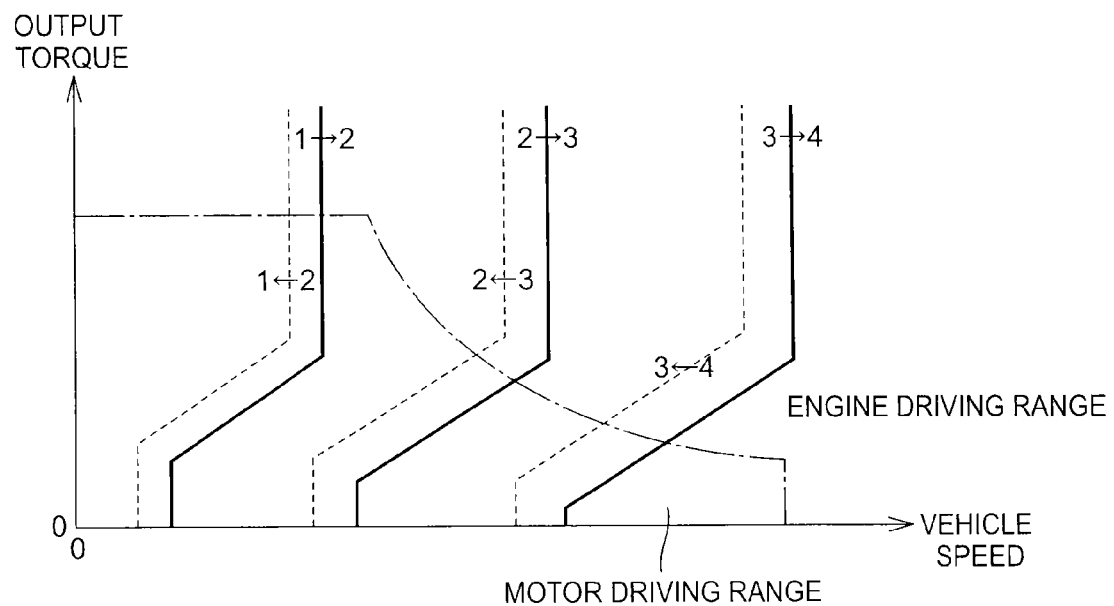
FIG. 6 shows a gear shift diagram.

The gear shift by the differential unit 20 and the transmission unit 30 described above is controlled in accordance with the gear shift diagram shown in FIG. 6, for example. Referring to FIG. 6, a horizontal axis represents the vehicle speed, and a vertical axis represents the output torque of the hybrid vehicle 10 calculated by the accelerator operation amount, the vehicle speed, and the like. The parameters for determining the gear shift are not limited to those.

A solid line represents an upshift line, and a dotted line represents a downshift line. Additionally, an area enclosed by an alternate long and short dash line represents a range of EV driving where the engine 12 stops and the vehicle is driven by only using the driving force from the motor generator MG2. During the EV driving, the engine 12 is kept stopping unless the charging is required due to low SOC of the electric storage device 54 or warm-up of a catalyst (not shown) is required. On the other hand, in the outside of the area enclosed by an alternate long and short dash line, the engine 12 operates, and thus the vehicle is driven by only using the driving force output from the engine 12. Alternatively, HV driving is performed in which the vehicle is driven by using the driving force output from the engine 12 in addition to the driving force from the motor generator MG2. It should be noted that the gear shift is performed even during the EV driving.

Figure 7:
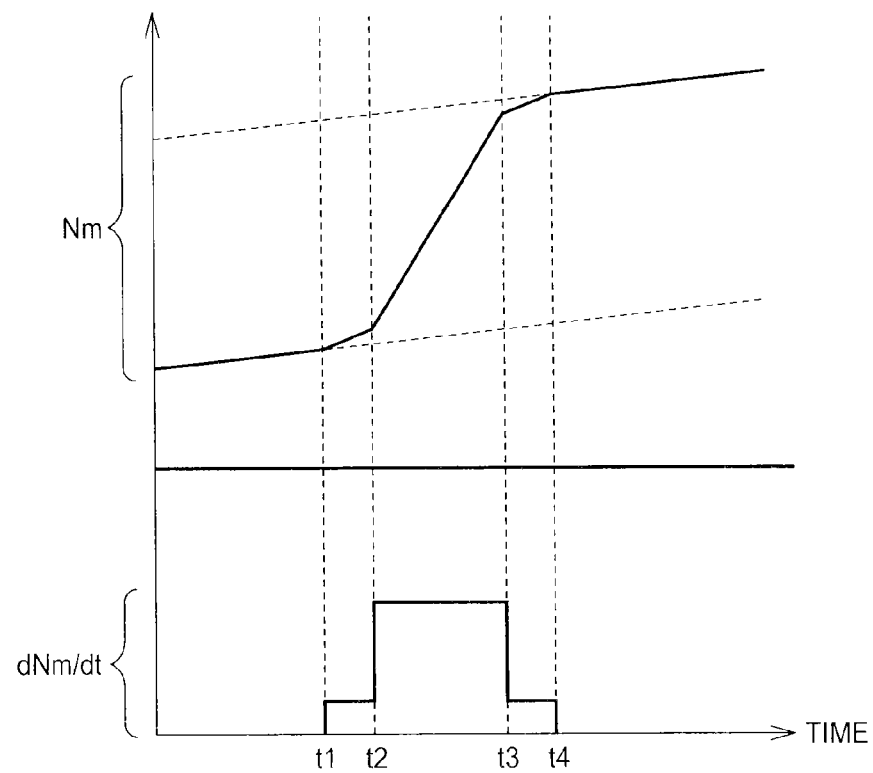
FIG. 7 is a diagram that shows one example of the speed and the angular acceleration of the motor generator during a certain gear shift in the transmission unit.

FIG. 7 is a diagram that shows one example of the speed Nm and the angular acceleration dNm/dt of the motor generator MG2 during a certain gear shift in the transmission unit 30. Referring to FIG. 7, the gear shift starts at time t1 and finishes at time t4. The behavior of the motor generator MG2 during the gear shift is defined by the angular acceleration dNm/dt for the speed Nm of the motor generator MG2. In the example of the gear shift shown in FIG. 7, the gear shift shock is suppressed by setting the angular acceleration dNm/dt to a small value for the time t2 to t3 between the time t1 to t2 immediately after the start of the gear shift and the time t to t4 immediately before the end of the gear shift.

In this first embodiment, by controlling the angular acceleration dNe/dt for the speed Ne of the engine 12 and the angular acceleration dNm/dt for the speed Nm of the motor generator MG2 to reach the target values, the behavior of the engine 12 and the differential unit 20 during the gear shift of the transmission unit 30 is controlled. The speed of the motor generator MG1 is uniquely determined in accordance with the collinear diagram shown in FIG. 5 when the speeds of the engine 12 and the motor generator MG2 are determined.

A constraint condition are applied to the gear shift. In this first embodiment, the constraint condition is applied to the target values for the angular accelerations dNe/dt and dNm/dt. Specifically, in view of drivability during the gear shift, progress of the gear shift, component protection, torque upper and lower limit of the motor generators MG1 and MG2, and the like, the constraint condition are applied to the target values for the angular accelerations dNe/dt and dNm/dt. The component protection includes overdischarge/overcharge prevention of the electric storage device 54 and overspeed/stall prevention of the engine 12, for example. A description is hereinafter made on the aforementioned points.

Figure 8:
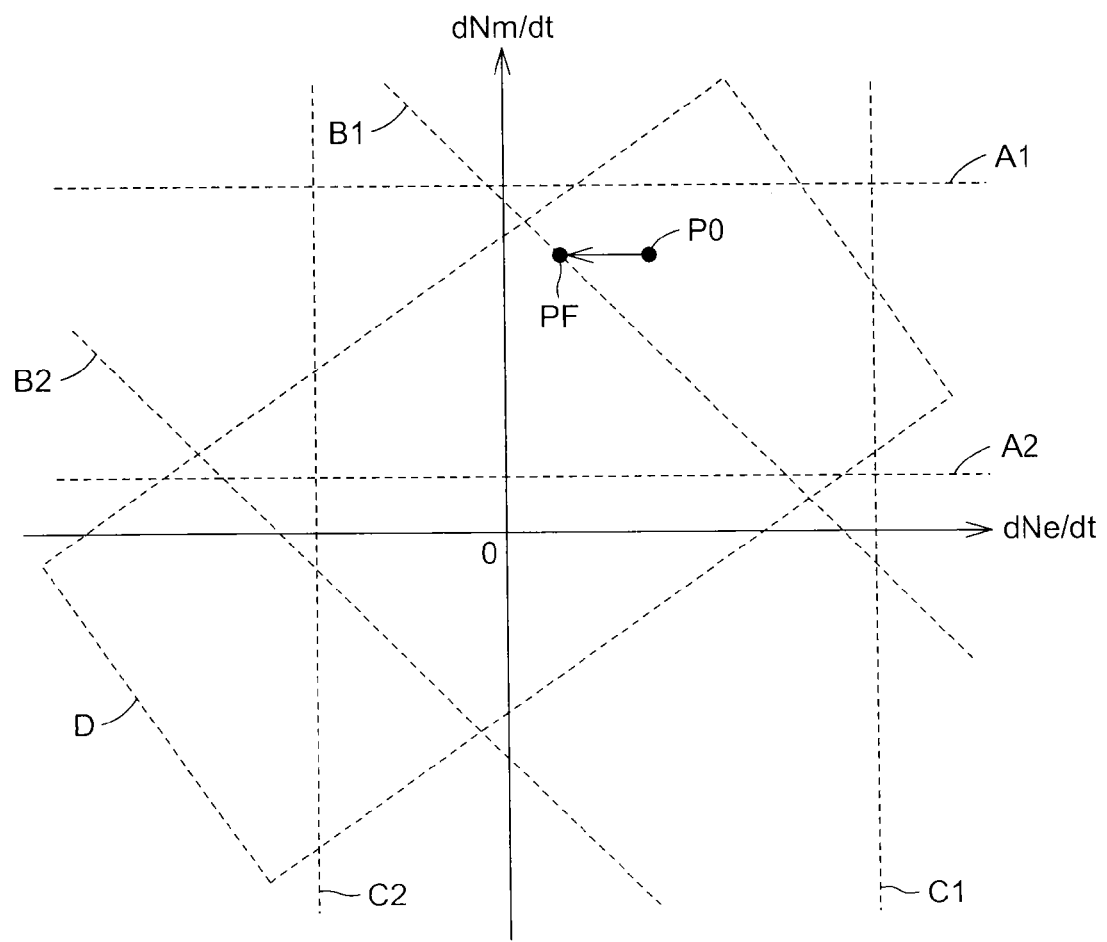
FIG. 8 is a diagram that shows a target values for the angular accelerations of the engine and the motor generator during a certain gear shift in the transmission unit and one example of constraint conditions on an angular acceleration plane.

FIG. 8 is a diagram that shows the target values for the angular accelerations of the engine 12 and the motor generator MG2 during a certain gear shift in the transmission unit 30 and one example of the constraint conditions on an angular acceleration plane. Referring to FIG. 8, the horizontal axis represents the angular acceleration dNe/dt for the speed Ne of the engine 12, and the vertical axis represents the angular acceleration dNm/dt for the speed Nm of the motor generator MG2.

A point P0 represents an initial setting the target values for the angular accelerations dNe/dt and dNm/dt during the gear shift (hereinafter also referred to as a "target P0"). The target P0 is set in advance for each gear shift type (that includes not only the change of the gear stage but also the change in upshift/downshift, which is a variety of gear shift types). The target P0 is supposed to be set in consideration of the drivability during the gear shift here. That is, a drivability requirement has already been applied to the target P0 to achieve the predetermined drivability. The constraint conditions for the target P0 may be set on the angular acceleration plane as the drivability requirement. For example, the angular acceleration dNe/dt may be decreased so as not to change the speed Ne of the engine 12 as least as possible during the gear shift when the accelerator operation amount is small, or the angular acceleration dNe/dt may be increased to provide an acceleration feel during the downshift when the accelerator pedal is depressed.

Lines A1, A2, B1, B2, C1, C2, and D represent one example of the constraint conditions that are applied to the angular accelerations dNe/dt and dNm/dt. The lines A1 and A2 represent a gear shift progress requirement that is one of the constraint conditions. That is, an upper limit and a lower limit are set to the angular acceleration dNm/dt such that the gear shift proceeds without return or delay of the gear shift during the gear shift process. In the end of the gear shift, the lines A1 and A2 may be changed so that the engagement of the transmission unit 30 has a high priority and the angular acceleration dNm/dt decreases.

The lines B1, B2, C1, and C2 represent a component protection requirement that is one of the constraint conditions. The lines B1 and B2 are the protection requirements of the electric storage device 54. More specifically, the line B1 defines the upper limit to the discharging electric power of the electric storage device 54, and the line B2 defines the upper limit to the charging electric power of the electric storage device 54.

Figure 9:
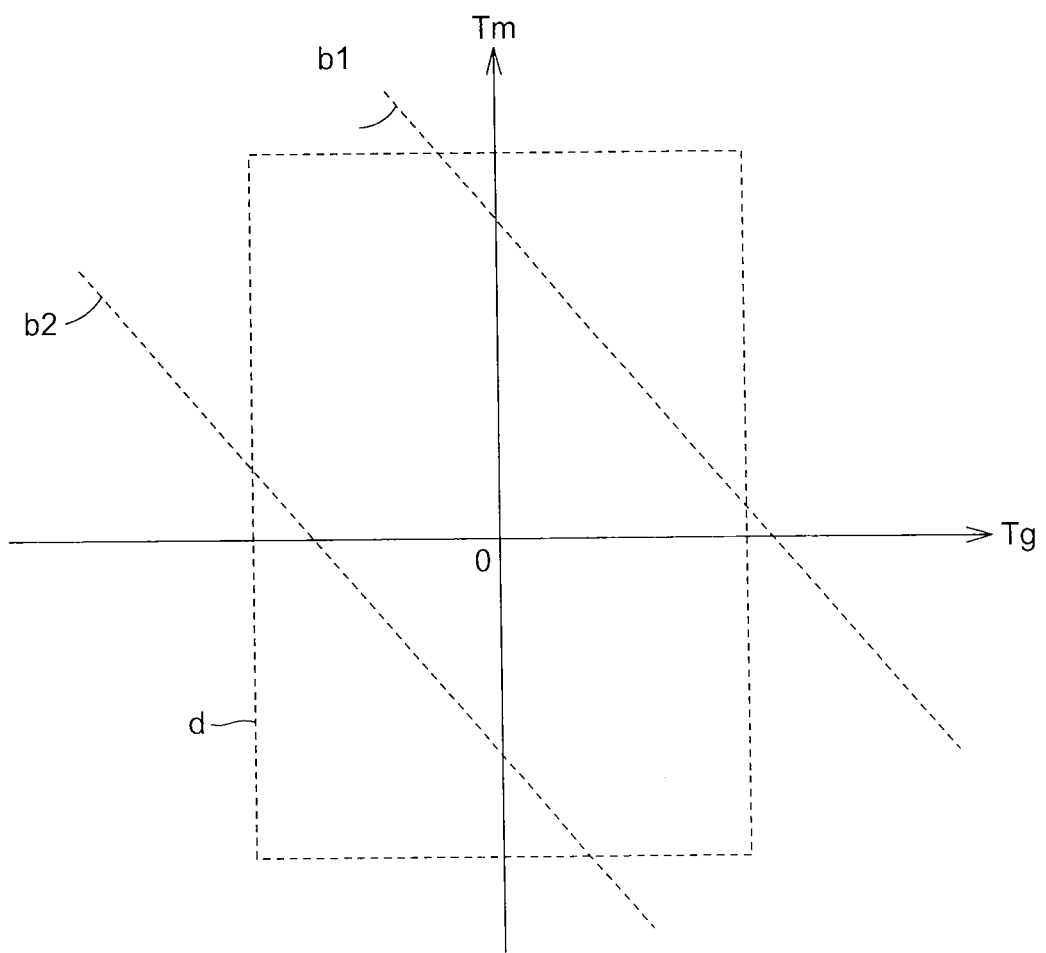
FIG. 9 is a diagram that illustrates the protection requirements of the electric storage device.

FIG. 9 is a diagram that illustrates the protection requirements of the electric storage device 54. Referring to FIG. 9, the horizontal axis represents torque Tg of the motor generator MG1, and the vertical axis represents torque Tm of the motor generator MG2. The electric storage device 54 supplies the electric power to the motor generators MG1 and MG2 and receives the electric power generated by the motor generators MG1 and MG2. The line b1 represents the dischargeable electric power Wout indicating the upper limit of discharging electric power of the electric storage device 54, and the line b2 represents the chargeable electric power Win indicating the upper limit of charging electric power of the electric storage device 54.

By performing coordinate transformations of the dischargeable electric power Wout (line b1) and the chargeable electric power Win (line b2) shown on a torque plane of the motor generators MG1 and MG2 into the angular acceleration plane shown in FIG. 8, the lines B1 and B2 shown in FIG. 8 can be obtained. The line B1 corresponds to the dischargeable electric power Wout, and the line B2 corresponds to the chargeable electric power Win.

Referring to FIG. 8 again, the lines C1 and C2 represent a protection requirement of the engine 12. Specifically, the line C1 defines the upper limit to the angular acceleration dNe/dt of the engine 12 such that the overspeed of the engine 12 is prevented, and the line C2 defines the lower limit to the angular acceleration dNe/dt of the engine 12 so that the engine 12 does not stop.

The line D represents an upper limit requirement and a lower limit requirement for the torque of the motor generators MG1 and MG2 that is one of the constraint conditions. Referring to FIG. 9 again, the line d represents the upper limit and the lower limit of the torque of the motor generators MG1 and MG2. By performing coordinate transformations of the upper limit and the lower limit of the torque (line d) shown on the torque plane of the motor generators MG1 and MG2 into the angular acceleration plane shown in FIG. 8, the line D shown in FIG. 8 can be obtained.

Referring to FIG. 8 again, the target P0 does not satisfy the protection requirement of the electric storage device 54 shown by the lines B1 and B2 that is one of the component protection requirements, and thus the target P0 is corrected to a target PF so as to satisfy the protection requirement of the electric storage device 54. In FIG. 8, the target value for the angular acceleration dNm/dt is not changed, but the target value for the angular acceleration dNe/dt is changed, and thus the target P0 is corrected to the target PF. The target P0 may be corrected to the target PF by not changing the target value for the angular acceleration dNe/dt but changing the target value for the angular acceleration dNm/dt, or changing both of the angular accelerations dNe/dt and dNm/dt.

In this first embodiment, although a plurality of the constraint conditions are applied as described above, each of the constraint conditions has a priority. For example, in this first embodiment, the upper limit requirement and the lower limit requirement for the torque of the motor generators MG1 and MG2 that are absolute constraint conditions have the highest priority, and in the order that it is considered import, the component protection requirement, the gear shift progress requirement, and the drivability requirement are given higher priorities. That is, as the order of the calculation for applying the constraint conditions to the angular accelerations dNe/dt and dNm/dt, the drivability requirement, the gear shift progress requirement, the component protection requirement, and the upper limit requirement and the lower limit requirement for the torque of the motor generators MG1 and MG2 are implemented in this order. As described above, the drivability requirement may be included in the setting of the target P0. Either one of the protection requirement of the electric storage device 54 or the protection requirement of the engine 12 that are included in the component protection requirement is given priority over another.

Figure 10:
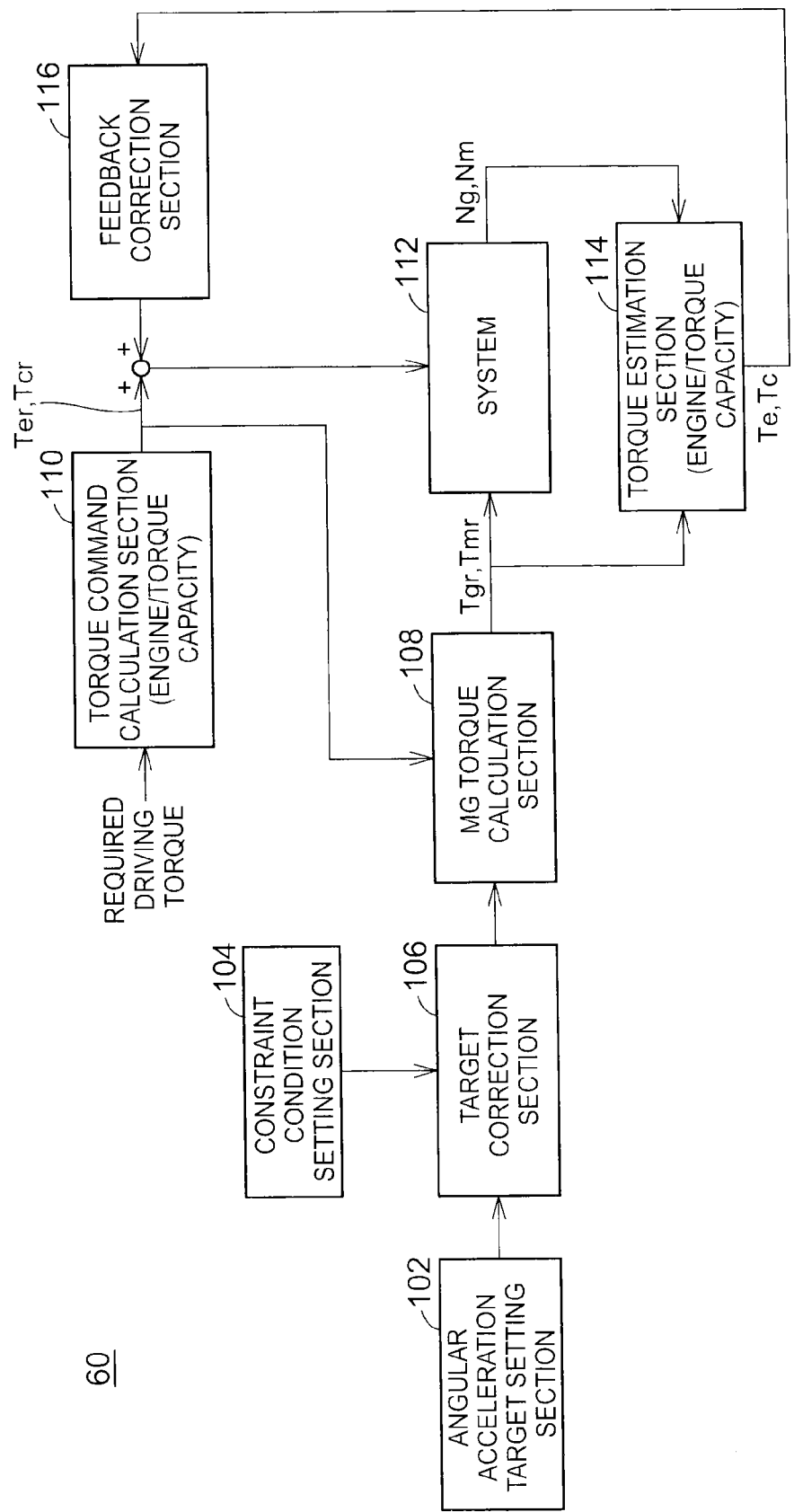
FIG. 10 is a functional block diagram that shows a functional configuration of the electronic control unit.

FIG. 10 is a functional block diagram that shows a functional configuration of the electronic control unit 60. Referring to FIG. 10, the electronic control unit 60 includes an angular acceleration target setting section 102, constraint condition setting section 104, a target correction section 106, and an MG torque calculation section 108. The electronic control unit 60 also includes a torque command calculation section 110, a torque estimation section 114, and a feedback correction section 116. A system 112 is a controlled object to which command values are applied, that is, an engine 12, the differential unit 20, and the transmission unit 30.

The angular acceleration target setting section 102 sets the target P0 (FIG. 8) of the angular accelerations dNe/dt and dNm/dt in response to the gear shift to be performed hereafter. The target P0 is obtained for each gear shift type in advance such that the speed of the engine 12 and the motor generator MG2 during the gear shift indicates predetermined behavior. The angular acceleration target setting section 102 sets the target P0 in response to the gear shift to be performed in accordance with the gear shift diagram shown in FIG. 6.

The constraint condition setting section 104 sets various constraint conditions applied to the angular accelerations dNe/dt and dNm/dt during the gear shift in response to the gear shift to be performed hereafter. For example, the constraint conditions setting section 104 sets the gear shift progress requirement, the component protection requirement, and the upper limit requirement and the lower limit requirement for the torque of the motor generators MG1 and MG2 in response to the gear shift to be performed. The component protection requirement includes overdischarge/overcharge prevention of the electric storage device 54 and overspeed/stall prevention of the engine 12. The drivability requirement is assumed to be included in the setting of the target P0 of the angular acceleration. The drivability requirement may be set in response to the gear shift to be performed by the constraint condition setting section 104.

The target correction section 106 corrects the target P0 set by the angular acceleration target setting section 102 such that the target P0 satisfies the constraint conditions set by the constraint condition setting section 104. For example, as shown in FIG. 8, the target correction section 106 corrects the target P0 to the target PF such that the target values for the angular accelerations dNe/dt and dNm/dt satisfies the constraint conditions.

The MG torque calculation section 108 calculates the torque commands Tgr and Tmr for the motor generators MG1 and MG2 that achieve the target values for the angular accelerations dNe/dt and dNm/dt corrected by the target correction section 106. Specifically, the MG torque calculation section 108 calculates the torque Tg and Tm as the torque commands Tgr and Tmr based on the angular accelerations dNe/dt and dNm/dt calculated by the target correction section 106 by using the equation of motion of the differential unit 20 shown in the following equation 1.

[Equation 1]

$$\begin{pmatrix} \frac{dNm}{dt} \\ \frac{dNe}{dt} \end{pmatrix} = \frac{1}{a}\begin{pmatrix} -\rho Ie & \rho^2 Ie + (1+\rho)^2 Ig \\ (1+\rho)^2 Im + Ie & -\rho Ie \end{pmatrix}\begin{pmatrix} Tg \\ Tm \end{pmatrix} + $$
$$\frac{1}{a}\begin{pmatrix} (1+\rho)Ig & -\rho^2 Ie - (1+\rho)^2 Ig \\ \rho(1+\rho)Im & \rho Ie \end{pmatrix}\begin{pmatrix} Te \\ Tc \end{pmatrix}$$
$$a = IgIe + \rho^2 ImIe + (1+\rho)^2 IgIe$$

(1)

Here, ρ denotes the gear ratio of the power-split device 24 (FIG. 3) in the differential unit 20. Additionally, Ie denotes the moment of inertia of the engine 12, Ig and Im respectively denote the moment of inertia of the motor generators MG1 and MG2.

The engine torque Te representative of the torque of the engine 12 and the torque capacity Tc of the transmission unit 30 in the equation 1 are calculated, in this first embodiment, based on the engine torque command Ter and the torque capacity command Tcr calculated by the torque command calculation section 110 described below. For example, the values obtained by dead time or first-order lag processing to the engine torque command Ter and the torque capacity command Tcr are applied to the engine torque Te and the torque capacity Tc in the equation 1, respectively.

The MG torque calculation section 108 outputs the calculated torque commands Tgr and Tmr for the motor generators MG1 and MG2 to the system 112 that is the controlled object as well as to the torque estimation section 114 described below.

The torque command calculation section 110 calculates the engine torque command Ter and the torque capacity command Tcr for the transmission unit 30 based on the required driving torque to the output shaft 36 (FIG. 3) and other various signals. The required driving torque is calculated based on the accelerator operation amount and the vehicle speed. The engine torque command Ter and the torque capacity command Tcr are added with a feedback correction amount calculated by the feedback correction section 116 described below and output to the system 112 that is the controlled object.

The torque estimation section 114 estimates the engine torque Te and the torque capacity Tc based on the torque Tg and Tm and the speeds Ng and Nm of the motor generators MG1 and MG2. Specifically, the torque estimation section 114 calculates the angular accelerations dNg/dt and dNm/dt from the speeds Ng and Nm (measured values) of the motor generators MG1 and MG2 and estimates the engine torque Te and the torque capacity Tc by using the following equation 2 derived from the equation of motion of the differential unit 20, based on the torque Tg and Tm and the angular accelerations dNg/dt and dNm/dt of the motor generators MG1 and MG2.

[Equation 2]

$$Te = -\frac{1+\rho}{\rho}Tg + \left(\frac{\rho}{1+\rho}Ie + \frac{1+\rho}{\rho}Ig\right)\frac{dNg}{dt} + \frac{\rho}{1+\rho}Ie\frac{dNm}{dt} \quad (2)$$

$$Tc = Tm - \frac{1}{\rho}Tg - Im\frac{dNm}{dt} + \frac{1}{\rho}Ig\frac{dNg}{dt}$$

For the torque Tg, the torque command Tgr may be used, or the torque calculated from the current command value for the motor generator MG1 may be used. Similarly, for the torque Tm, the torque command Tmr may be used, or the torque calculated from the current command value for the motor generator MG2 may be used. The speeds Ng and Nm of the motor generators MG1 and MG2 is detected by the speed sensors such as resolvers, which are not illustrated.

The feedback correction section 116 receives estimated values of the engine torque Te and the torque capacity Tc estimated by the torque estimation section 114 and carries out the feedback calculation such as a proportional-integral control. The correction amount calculated by the feedback correction section 116 is added to the engine torque command Ter and the torque capacity command Tcr calculated by the torque command calculation section 110 and output to the system 112 that is the controlled object.

Figure 11:
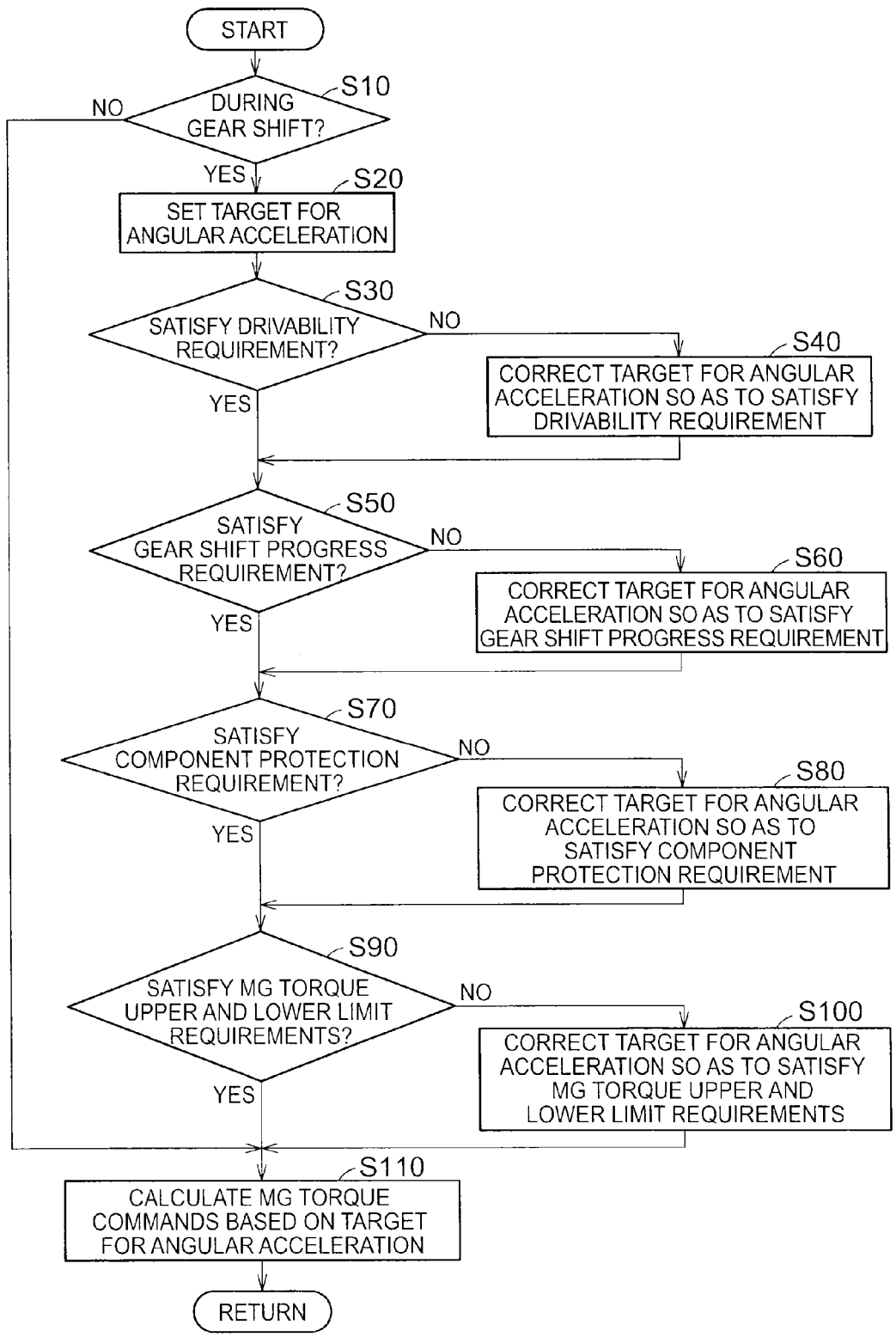
FIG. 11 is a flowchart that illustrates a target value calculation processing of the angular acceleration that is executed by the electronic control unit.

FIG. 11 is a flowchart that illustrates target calculation processing of the angular accelerations dNe/dt and dNm/dt that is executed by the electronic control unit 60. This flowchart is implemented when a program stored in advance is called by a main routine and executed. Alternatively, for entire or a part of steps, the dedicated hardware (electronic circuit) can be built to implement the processing.

Referring to FIG. 11, the electronic control unit 60 determines whether or not the transmission unit 30 is in the gear shift (step S10). When the transmission unit 30 is in the gear shift, the type of the gear shift (gear stage and upshift/downshift) is also determined. When the transmission unit 30 is not in the gear shift (NO in the step S10), the process proceeds to the step S110 described below.

When it is determined that the transmission unit 30 is in the gear shift in the step S10 (YES in the step S10), the electronic control unit 60 sets the target values (initial value) for the angular accelerations dNe/dt and dNm/dt (step S20). As described above, the target values for the angular accelerations dNe/dt and dNm/dt is set in response to the gear shift to be performed.

The electronic control unit 60 then determines whether or not the angular accelerations dNe/dt and dNm/dt set in the step S20 satisfies the drivability requirement (step S30). When it is determined that the drivability requirement is satisfied (YES in the step S30), the process proceeds to the step S50 described below.

When it is determined that the drivability requirement is not satisfied in the step S30 (NO in the step S30), the electronic control unit 60 corrects the target values for the angular accelerations dNe/dt and dNm/dt so as to satisfy the drivability requirement (step S40). As described above, when the target values set in the step S20 has already included the drivability requirement, the steps S30 and S40 are skipped.

The electronic control unit 60 then determines whether or not the angular accelerations dNe/dt and dNm/dt satisfies the gear shift progress requirement (step S50). When the angular acceleration is corrected in the step S40, the determination of the gear shift progress requirement is made on the corrected angular acceleration. When it is determined that the gear shift progress requirement is satisfied (YES in the step S50), the process proceeds to the step S70 described below. When it is determined that the gear shift progress requirement is not satisfied in the step S50 (NO in the step S50), the electronic control unit 60 corrects the target values for the angular accelerations dNe/dt and dNm/dt so as to satisfy the gear shift progress requirement (step S60).

The electronic control unit 60 then determines whether or not the angular accelerations dNe/dt and dNm/dt satisfies the component protection requirement (step S70). When the angular acceleration is corrected in the step S40 or S60, the determination of the component protection requirement is made on the corrected angular acceleration. When it is determined that the component protection requirement is satisfied (YES in the step S70), the process proceeds to the step S90 described below. When it is determined that the component protection requirement is not satisfied in the step S70 (NO in the step S70), the electronic control unit 60 corrects the target values for the angular accelerations dNe/dt and dNm/dt so as to satisfy the component protection requirement (step S80).

The electronic control unit 60 then determines whether or not the angular accelerations dNe/dt and dNm/dt satisfies the upper limit requirement and the lower limit requirement for the torque of the motor generators MG1 and MG2 (step S90). When the angular acceleration is corrected in the step S40, S60, or S80, the determination of the upper limit requirement and the lower limit requirement for the torque of the motor generators is made on the corrected angular acceleration. When it is determined that the upper limit requirement and the lower limit requirement for the torque of the motor generators is satisfied (YES in the step S90), the process proceeds to the step S110 described below. When it is determined that the upper limit requirement and the lower limit requirement for the torque of the motor generators are not satisfied in the step S90 (NO in the step S90), the electronic control unit 60 corrects the target values for the angular accelerations dNe/dt and dNm/dt so as to satisfy the upper limit requirement and the lower limit requirement for the torque of the motor generators (step S100).

The electronic control unit 60 calculates the torque commands Tgr and Tmr for the motor generators MG1 and MG2 by using the equation 1 described above, based on the set or corrected target values for the angular acceleration dNe/dt and dNm/dt (step S110).

As described above, in this first embodiment, the target values for the angular acceleration dNe/dt of the engine 12 and the angular acceleration dNm/dt of the motor generator MG2 is set during the gear shift of the transmission unit 30, and the constraint conditions during the gear shift are applied to the target values (a first target value and a second target value) respectively. Then, the torque commands Tgr and Tmr for the motor generators MG1 and MG2 that achieve the target values for the angular acceleration corrected based on the constraint conditions are calculated based on a model (equation 1) derived from the equation of motion. The electronic control unit 60 controls the first motor MG1 and the second motor MG2 when an engagement state of the engagement device changes, such that a first angular acceleration and a second angular acceleration reach the first target value and the second target value respectively, the first angular acceleration and the second angular acceleration being two angular accelerations of the engine 12, the first motor MG1, and the second motor MG2. The electronic control unit 60 calculates the first target value and the second target value by applying a constraint condition to at least one of the first target value and the second target value As described above, according to the first embodiment, high accurate gear shift can be performed by setting appropriate control target values in consideration of a constraint condition.

According to this first embodiment, the constraint condition are applied to the target values of the angular accelerations dNe/dt and dNm/dt, the gear shift control is performed by using the model derived from the equation of motion based on the target values of the angular acceleration in consideration of the constraint condition, and therefore the gear shift control that satisfies the constraint condition can be achieved without having a number of adaptive points in a map or the like.

According to this first embodiment, as the constraint condition, the drivability requirement, the gear shift progress requirement, the component protection requirement, and the upper limit requirement and the lower limit requirement for the torque of the motor generators MG1 and MG2 can be applied to the target values of the angular accelerations dNe/dt and dNm/dt in the predetermined order of priority. The component protection requirement includes the overdischarge/overcharge prevention of the electric storage device 54 and the overspeed/stall prevention of the engine 12.

In the first embodiment, when the torque commands Tgr and Tmr for the motor generators MG1 and MG2 are calculated based on the target values for the angular accelerations dNe/dt and dNm/dt, the engine torque command Ter and the torque capacity command Tcr are used for the engine torque Te and the torque capacity Tc in the equation 1. In this second embodiment, when the torque commands Tgr and Tmr are calculated, the estimated values of the engine torque Te and the torque capacity Tc estimated by the torque estimation section 114 are used. Consequently, higher accurate gear shift control can be achieved.

Overall structure of the hybrid vehicle according to the second embodiment and the structure of the differential unit 20 and the transmission unit 30 are the same as that of the hybrid vehicle 10 according to the first embodiment.

Figure 12:
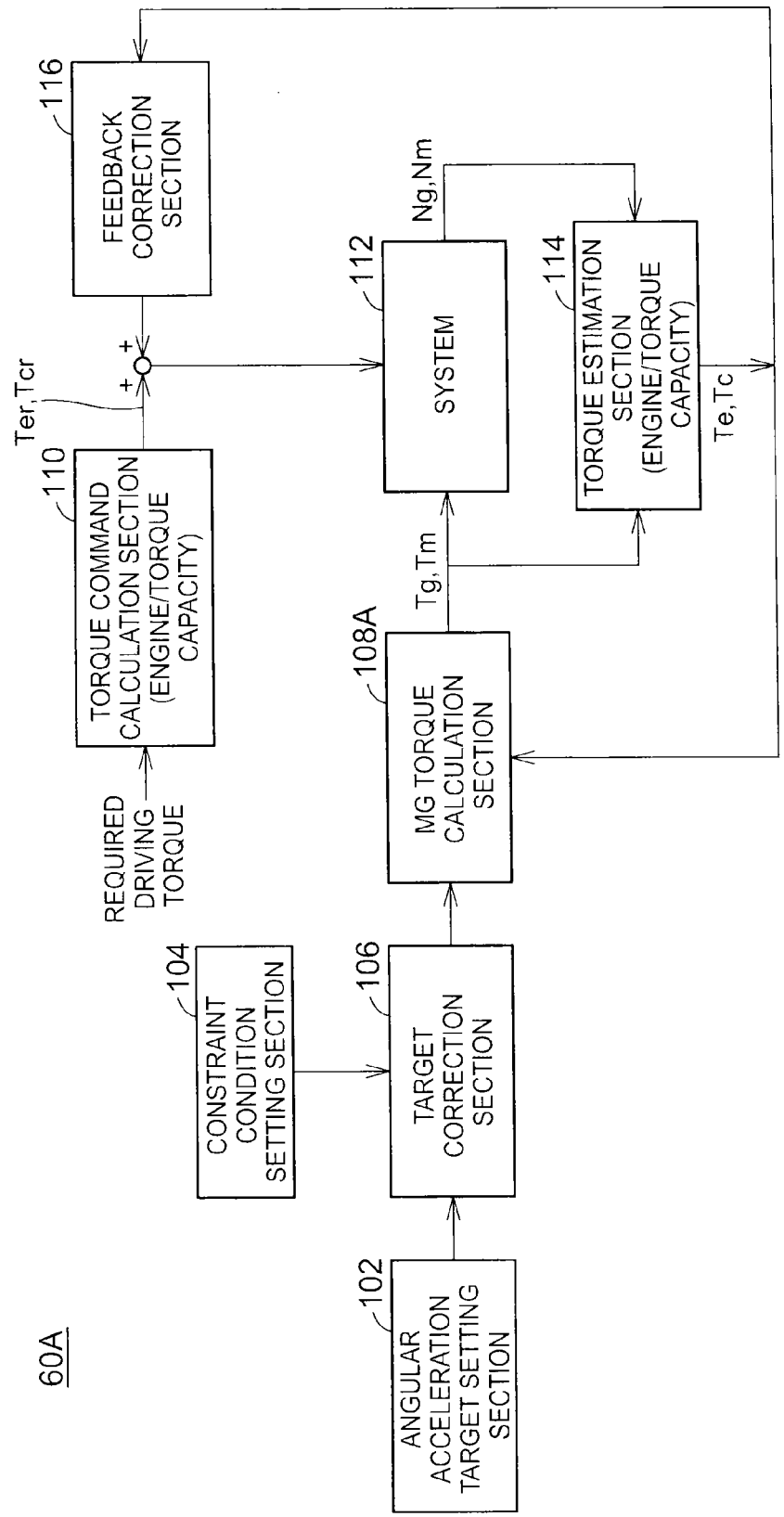
FIG. 12 is a functional block diagram that shows a configuration of an electronic control unit in a second embodiment.

FIG. 12 is a functional block diagram that shows a configuration of a electronic control unit 60A in the second embodiment. Referring to FIG. 12, the electronic control unit 60A includes an MG torque calculation section 108A in place of the MG torque calculation section 108 in the configuration of the electronic control unit 60 in the first embodiment shown in FIG. 10.

The MG torque calculation section 108A calculates the torque Tg and Tm as the torque commands Tgr and Tmr for the motor generators MG1 and MG2 by using the equation 1 described above, based on the target values of the angular accelerations dNe/dt and dNm/dt corrected by the target correction section 106 and the estimated values of the engine torque Te and the torque capacity Tc of the transmission unit 30 estimated by the torque estimation section 114. The estimated values of the engine torque Te and the torque capacity Tc are calculated by using the equation 2 described above.

According to this second embodiment, the engine torque Te and the torque capacity Tc estimated by the torque estimation section 114 are used when the torque Tg and Tm for the motor generators MG1 and MG2 that achieve the target values for the angular accelerations dNe/dt and dNm/dt are calculated, and thus higher accurate gear shift control can be achieved.

The torque estimation section 114 that estimates the engine torque Te and the torque capacity Tc uses the measured values of the speeds Ng and Nm of the motor generators MG1 and MG2. In this third embodiment, lowpass filter processing is performed to the foregoing speeds Ng and Nm used by the torque estimation section 114, and the engine torque Te and the torque capacity Tc are estimated by using the measured values that are processed with the filter. The time constant in the low-pass filter processing is variable depending on various conditions.

Overall structure of the hybrid vehicle according to the third embodiment and the structure of the differential unit 20 and the transmission unit 30 are also the same as that of the hybrid vehicle 10 according to the first embodiment.

Figure 13:
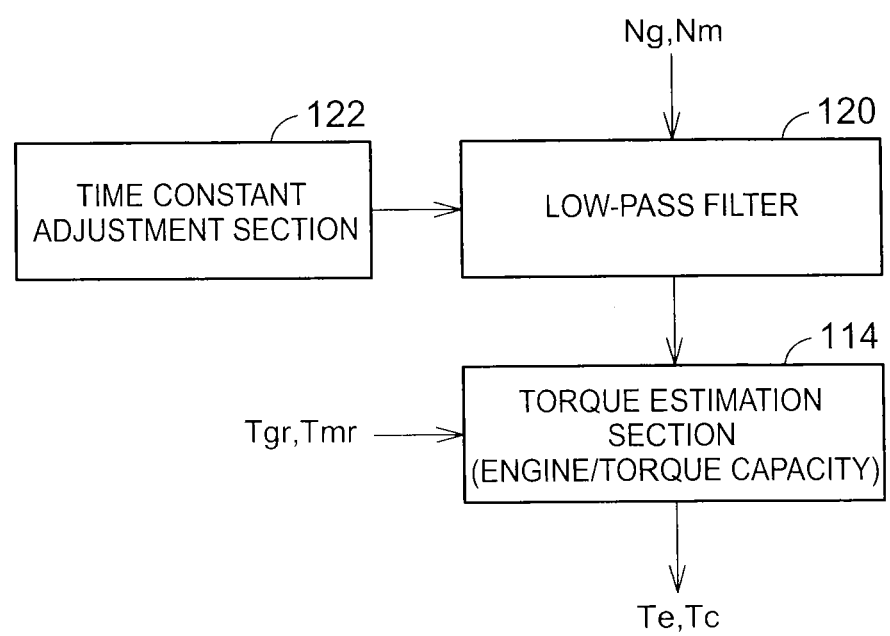
FIG. 13 is a block diagram that shows the sections relating to the torque estimation of the engine torque and the torque capacity that is executed by an electronic control unit in a third embodiment.

FIG. 13 is a block diagram that shows the sections relating to the torque estimation of the engine torque Te and the torque capacity Tc that is executed by the electronic control unit in the third embodiment. Referring to FIG. 13, the electronic control unit in the third embodiment includes a low-pass filter 120 and a time constant adjustment section 122 in addition to the configuration of the electronic control unit 60 (or 60A) in the first or second embodiment.

The low-pass filter 120 performs the low-pass filter processing to the speeds Ng and Nm (measured values) of the motor generators MG1 and MG2. The time constant used by the low-pass filter 120 is adjusted by the time constant adjustment section 122.

The time constant adjustment section 122 adjusts the time constant for the low-pass filter 120 according to the predetermined conditions. Specifically, the time constant adjustment section 122 increases the time constant for the low-pass filter 120 during the occurrence of vehicle slip with respect to that when the vehicle is not slipped. During the occurrence of vehicle slip, the speeds Ng and Nm of the motor generators MG1 and MG2 change abruptly, and thus if the torque estimated value and the torque command are changed in response to the abrupt change of the speeds, there is a possibility that the shock due to the slip may increase. The determination whether or not the slip occurs is made based on the rotational fluctuation of the driving wheels.

Additionally, the time constant adjustment section 122 may increase the time constant for the low-pass filter 120 when the operation mode of the engine 12 is in idling or motoring (that is a state where the engine 12 operates without fuel injection and ignition) relatively to the state other than the idling or the motoring. The torque of the engine 12 is less likely to change rapidly during the aforementioned operating mode, and thus the stability of control is given priority.

When the rate of change in the speeds Ng and Nm of the motor generators MG1 and MG2 is high (except in the case of slip detection) or the required driving power by the driver is large, the time constant adjustment section 122 may decrease the time constant for the low-pass filter 120, so as to follow the change in the speeds Ng and Nm, relatively to the other case than that where the rate of change in the speeds Ng and Nm of the motor generators MG1 and MG2 is high (except in the case of slip detection) or the required driving power by the driver is large.

The torque estimation section 114 estimates the engine torque Te of the engine 12 and the torque capacity Tc of the transmission unit 30 based on the torque Tg and Tm of the motor generators MG1 and MG2 and the speeds Ng and Nm passed through the low-pass filter 120.

In the above description, the low-pass filter processing is performed to the speeds Ng and Nm (measured values) of the motor generators MG1 and MG2; however, the low-pass filter processing may be performed to the angular accelerations dNg/dt and dNm/dt calculated from the speeds Ng and Nm.

Although not specifically illustrated, the other configurations of the electronic control unit in this third embodiment are the same as the configuration of the electronic control unit 60 in the first embodiment or the electronic control unit 60A in the second embodiment.

According to the third embodiment, highly accurate estimation of the engine torque Te and the torque capacity Tc can be achieved, and consequently higher accurate gear shift control can be achieved.

Figure 14:
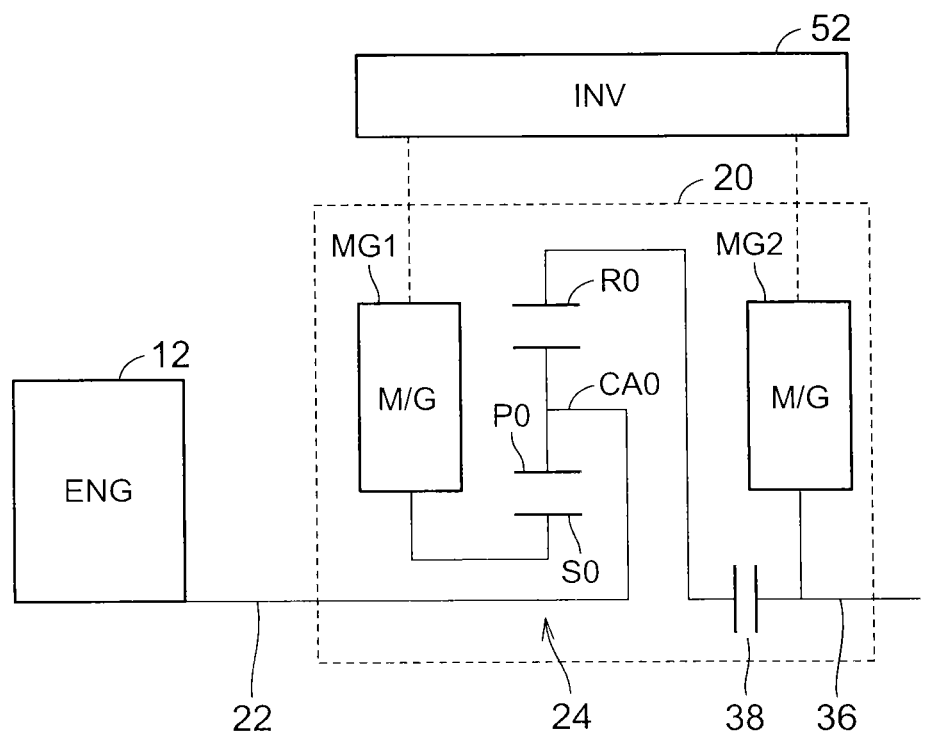
FIG. 14 is a diagram that shows another configuration of the hybrid vehicle.

In each of the embodiments described above, the transmission unit 30 is disposed in a power transmission path between the differential unit 20 and the drive shaft (output shaft 36). The present invention is also applicable to the hybrid vehicle including the clutches that can cut off the power transmission through the power transmission path as the engagement devices, in place of the transmission unit 30. For example, the vehicle may be provided with the clutch in place of the transmission unit 30 shown in FIG. 3, or the vehicle may include the clutch 38 that can cut off the power transmission between the power-split device 24 and the output shaft 36 as shown in FIG. 14. For the vehicle, the target values for the angular accelerations dNe/dt and dNm/dt is set when the engagement state of such a clutch changes, the constraint conditions are applied to the target values, and the torque commands Tgr and Tmr for the motor generators MG1 and MG2 that achieve the target values for the angular acceleration corrected based on the constraint conditions are calculated.

In each of the embodiments described above, the angular acceleration dNe/dt of the engine 12 and the angular acceleration dNm/dt of the motor generator MG2 are controlled to reach the target values respectively. When two speeds of the engine 12 and the motor generators MG1 and MG2 are determined, the speed of the remaining one is uniquely determined in accordance with the collinear diagram in FIG. 5. Thus, the present invention may include a component for controlling any two of the angular accelerations of the engine 12 and the motor generators MG1 and MG2 to reach the target values.

In each of the embodiments described above, the motor generator MG2 is connected to the output shaft 36. A reduction section may be disposed between the motor generator MG2 and the output shaft 36. Furthermore, the transmission unit 30 may be the stepped transmission such as an automatic transmission (AT), a dual clutch transmission (DCT), and a manual transmission (MT) or the continuously variable transmission (CVT). The clutch that can cut off the power may be disposed between the engine 12 and the motor generator MG1.

In the above description, the differential unit 20 is one example of the "differential device" in the present invention, and the motor generators MG1 and MG2 is the examples of a "first motor" and a "second motor" in the present invention, respectively. The engine 12 is one example of the "internal combustion engine" in the present invention, and the transmission unit 30 and the clutch 38 are the example of the "engagement device" in the present invention.

The embodiments disclosed herein are to be considered in all respects as illustrative and not restrictive. The scope of the present invention is indicated by the appended claims rather than by the foregoing description, and all changes which come within the meaning and range of equivalency of the claims are therefore intended to be embraced therein.

What is claimed is:

1. A hybrid vehicle comprising:
a differential device constituted with a first rotating element, a second rotating element, and a third rotating element;
a first motor coupled to the first rotating element;
an engine coupled to the second rotating element;
a second motor coupled to a power transmission path between the third rotating element and a drive shaft;
an engagement device disposed in the power transmission path and configured to change a power transmission state between the differential device and the drive shaft;
an electronic control unit configured to:
(a) control the first motor and the second motor when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and
(b) calculate the first target value and the second target value by applying a constraint condition to at least one of the first target value and the second target value, by setting the first target value and the second target value as a coordinate pair in an acceleration plane where axes of the acceleration plane are the first angular acceleration and the second angular acceleration and the constraint condition is a line on the acceleration plane that limits the coordinate pair; and
an electric storage device configured to supply and receive electric power to and from the first motor and the second motor, wherein
the first angular acceleration is the angular acceleration of the engine,
the second angular acceleration is the angular acceleration of the second motor,
an upper limit and a lower limit are applied to a torque of the first motor and the second motor,
the engagement device includes a transmission,
the constraint condition includes a first condition, a second condition, a third condition, and a fourth condition, the electronic control unit is configured to apply the constraint condition to the first target value and the second target value in the order of the first condition, the second condition, the third condition, and the fourth condition, the first condition is applied to the first target value such that a speed of the engine is a predetermined value when the engagement state of the engagement device changes, the second condition is applied to the second target value such that gear shift of the transmission proceeds, the third condition includes at least one of
  (i) a condition that is set by performing coordinate transformations of dischargeable electric power and chargeable electric power as lines on the angular acceleration plane, the dischargeable electric power being a upper limit of the discharging electric power of the electric storm device and the chargeable electric power being a upper limit of the charging electric power of the electric storage device, and
  (ii) a condition that is applied to the first target value such that the speed of the engine does not exceed a specified upper limit and lower limit, and the fourth condition is set by performing the coordinate transformations of the upper limit and the lower limit of the torque of the first motor and the second motor as lines on the angular acceleration plane.

2. The hybrid vehicle according to claim 1, wherein
the electronic control unit is configured to correct the first target value and the second target value such that the first target value and the second target value satisfy the constraint condition when the first target value and the second target value do not satisfy the constraint condition.

3. The hybrid vehicle according to claim 1, wherein
the electronic control unit is configured to calculate a first torque and a second torque based on the first target value and the second target value to which the constraint condition is applied by using a model of the differential device expressing a relation among the first angular acceleration, the second angular acceleration, and the electronic control unit is configured to control the first motor and the second motor so as to respectively output the first torque and the second torque.

4. The hybrid vehicle according to claim 3, wherein
the electronic control unit is configured to estimate a torque capacity based on the angular accelerations of the first motor and the second motor by using the model, and the electronic control unit is configured to calculate the first torque and the second torque by using the estimated torque capacity.

5. The hybrid vehicle according to claim 4, wherein
the electronic control unit is configured to estimate the torque of the engine based on the angular accelerations of the first motor and the second motor by using the model, and the electronic control unit is configured to calculate the first torque and the second torque by using the estimated torque of the engine.

6. The hybrid vehicle according to claim 4, wherein
the electronic control unit is configured to perform low-pass filter processing to measured values of speeds of the first motor and the second motor, and the electronic control unit is configured to calculate the angular accelerations of the first motor and the second motor based on the measured values to which the low-pass filter processing is performed.

7. The hybrid vehicle according to claim 6, wherein
the electronic control unit is configured to change a time constant in the low-pass filter processing depending on driving conditions of the hybrid vehicle.

8. The hybrid vehicle according to claim 1, wherein
the transmission is disposed in a power transmission path between the second motor and the drive shaft.

9. A hybrid vehicle comprising:
a differential device constituted with a first rotating element, a second rotating element, and a third rotating element;
a first motor coupled to the first rotating element;
an engine coupled to the second rotating element;
a second motor coupled to a power transmission path between the third rotating element and a drive shaft;
an engagement device disposed in the power transmission path and configured to change a power transmission state between the differential device and the drive shaft;
an electronic control unit configured to:
  (a) control the first motor and the second motor when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and
  (b) correct the first target value and the second target value such that the first target value and the second target value satisfy a constraint condition, by setting the first target value and the second target value as a coordinate pair in an acceleration plane where axes of the acceleration plane are the first angular acceleration and the second angular acceleration and the constraint condition is a line on the acceleration plane that limits the coordinate pair and adjusting the coordinate pair when the first target value and the second target value do not satisfy the constraint condition; and
an electric storage device configured to supply and receive electric power to and from the first motor and the second motor, wherein the first angular acceleration is the angular acceleration of the engine, the second angular acceleration is the angular acceleration of the second motor, an upper limit and a lower limit are applied to a torque of the first motor and the second motor, the engagement device includes a transmission, the constraint condition includes a first condition, a second condition, a third condition, and a fourth condition, the electronic control unit is configured to apply the constraint condition to the first target value and the second target value in the order of the first condition, the second condition, the third condition, and the fourth condition, the first condition is applied to the first target value such that a speed of the engine is a predetermined value when the engagement state of the engagement device changes, the second condition is applied to the second target value such that gear shift of the transmission proceeds, the third condition includes at least one of
  (i) a condition that is set by performing coordinate transformations of dischargeable electric power and chargeable electric power as lines on the angular acceleration plane the dischargeable electric power being a upper limit of the discharging electric power of the electric storage device, and the chargeable electric power being a upper limit of the charging electric power of the electric storage device, and (ii) a condition that is applied to the first target value such that the speed of the engine does not exceed a specified upper limit and lower limit, and the fourth condition is set by performing the coordinate transformations of the upper limit and the lower limit of the torque of the first motor and the second motor as lines on the angular acceleration plane.

10. A control method for a hybrid vehicle including a differential device constituted with a first rotating element, a second rotating element, and a third rotating element, a first motor coupled to the first rotating element, an engine coupled to the second rotating element, a second motor coupled to a power transmission path between the third rotating element and a drive shaft, an engagement device disposed in the power transmission path and configured to change a power transmission state between the differential device and the drive shaft, an electric storage device configured to supply and receive electric power to and from the first motor and the second motor, and an electronic control unit, the control method comprising:

(a) controlling the first motor and the second motor by the electronic control unit when an engagement state of the engagement device changes, such that a first angular acceleration and a second angular acceleration reach a first target value and a second target value respectively, the first angular acceleration and the second angular acceleration being two angular accelerations of the engine, the first motor, and the second motor; and (b) calculating, by the electronic control unit, the first target value and the second target value by applying a constraint condition to at least one of the first target value and the second target value by setting the first target value and the second target value as a coordinate pair in an acceleration plane where axes of the acceleration plane are the first angular acceleration and the second angular acceleration and the constraint condition is a line on the acceleration plane that limits the coordinate pair, wherein the first angular acceleration is the angular acceleration of the engine, the second angular acceleration is the angular acceleration of the second motor, an upper limit and a lower limit are applied to a torque of the first motor and the second motor, the engagement device includes a transmission, the constraint condition includes a first condition, a second condition, a third condition, and a fourth condition, the control method further includes applying the constraint condition to the first target value and the second target value in the order of the first condition, the second condition, the third condition, and the fourth condition, the first condition is applied to the first target value such that a speed of the engine is a predetermined value when the engagement state of the engagement device changes, the second condition is applied to the second target value such that gear shift of the transmission proceeds, the third condition includes at least one of (i) a condition that is set by performing coordinate transformations of dischargeable electric power and chargeable electric power as lines on the angular acceleration plane, the dischargeable electric power being a upper limit of the discharging electric power of the electric storage device, and the chargeable electric power being a upper limit of the charging electric power of the electric storage device, and (ii) a condition that is applied to the first target value such that the speed of the engine does not exceed a specified upper limit and lower limit, and the fourth condition is set by performing the coordinate transformations of the upper limit and the lower limit of the torque of the first motor and the second motor as lines on the angular acceleration plane.

* * * * *